(12) United States Patent
Nojima et al.

(10) Patent No.: US 6,596,032 B2
(45) Date of Patent: Jul. 22, 2003

(54) DOCUMENT PROCESSING APPARATUS STORING AND MODIFYING DATA USING EFFECT DATA

(75) Inventors: Shin-ichi Nojima, Kawasaki (JP); Sadamichi Matsumoto, Kawasaki (JP); Miyuki Sasaki, Nagaoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/949,849

(22) Filed: Oct. 14, 1997

(65) Prior Publication Data

US 2002/0004805 A1 Jan. 10, 2002

(30) Foreign Application Priority Data

Oct. 15, 1996 (JP) ............................................. 8-272515

(51) Int. Cl.⁷ ............................................. G06F 15/00
(52) U.S. Cl. ....................... 715/517; 715/520; 345/624; 345/629
(58) Field of Search ............................... 707/520, 521, 707/517, 522, 526; 345/133, 339, 624, 629, 634

(56) References Cited

U.S. PATENT DOCUMENTS

| | | | | |
|---|---|---|---|---|
| 4,454,576 A | * | 6/1984 | McInroy et al. | 707/522 |
| 4,800,510 A | * | 1/1989 | Vinberg et al. | 345/440 |
| 5,379,373 A | * | 1/1995 | Hayashi et al. | 707/513 |
| 5,517,621 A | * | 5/1996 | Fukui et al. | 715/517 |
| 5,649,216 A | * | 7/1997 | Sieber | 707/517 |
| 5,649,220 A | * | 7/1997 | Yosefi | 707/526 |
| 5,845,303 A | * | 12/1998 | Templeman | 707/517 |
| 5,900,002 A | * | 5/1999 | Bottomly | 715/517 |
| 5,930,811 A | * | 7/1999 | Nojima et al. | 707/517 |
| 6,009,431 A | * | 12/1999 | Anger et al. | 707/10 |
| 6,016,146 A | * | 1/2000 | Beer et al. | 345/349 |
| 6,144,974 A | * | 11/2000 | Gartland | 707/517 |
| 6,182,096 B1 | * | 1/2001 | Mastie et al. | 707/517 |
| 6,301,586 B1 | * | 10/2001 | Yang et al. | 707/104.1 |

OTHER PUBLICATIONS

Microsoft Word 97, Microsoft Corporation, screen printouts, pp. 1–3, May 1997.*

* cited by examiner

Primary Examiner—Heather R. Herndon
Assistant Examiner—Cong-Lac Huynh
(74) Attorney, Agent, or Firm—Staas & Halsey LLP

(57) ABSTRACT

A document processing apparatus simplifies a user's manipulations for selecting a layout or inserting a part into a selected layout, and enables a user to increase the number of parts the user can choose with a simple manipulation and without an increase in storage capacity for parts. A layout/parts list display control unit defines a layout area and a parts list area in a screen on a display unit on the basis of layout data and part data, displays one layout or a plurality of layouts in the layout area, and displays a list of parts to be inserted into the layouts in the parts list area. A part insertion unit, in response to selection of one part from the list of parts, inserts the part into associated fields in all the layouts displayed in the layout area. An effect data memory unit stores effect data used to modify part data and a modification unit modifies part data in accordance with effect data.

16 Claims, 31 Drawing Sheets

Fig. 10A

PART EFFECT INFORMATION TABLE

| CODE 0000, PART EFFECT INFORMATION STORAGE ADDRESS 0 |
|---|
| CODE 0001, PART EFFECT INFORMATION STORAGE ADDRESS 1 |
| ⋮ |
| CODE n-1, PART EFFECT INFORMATION STORAGE ADDRESS n-1 |
| ⋮ |
| CODE 0000, PART EFFECT INFORMATION 0 |
| CODE 0001, PART EFFECT INFORMATION 1 |
| ⋮ |
| CODE n-1, PART EFFECT INFORMATION n-1 |

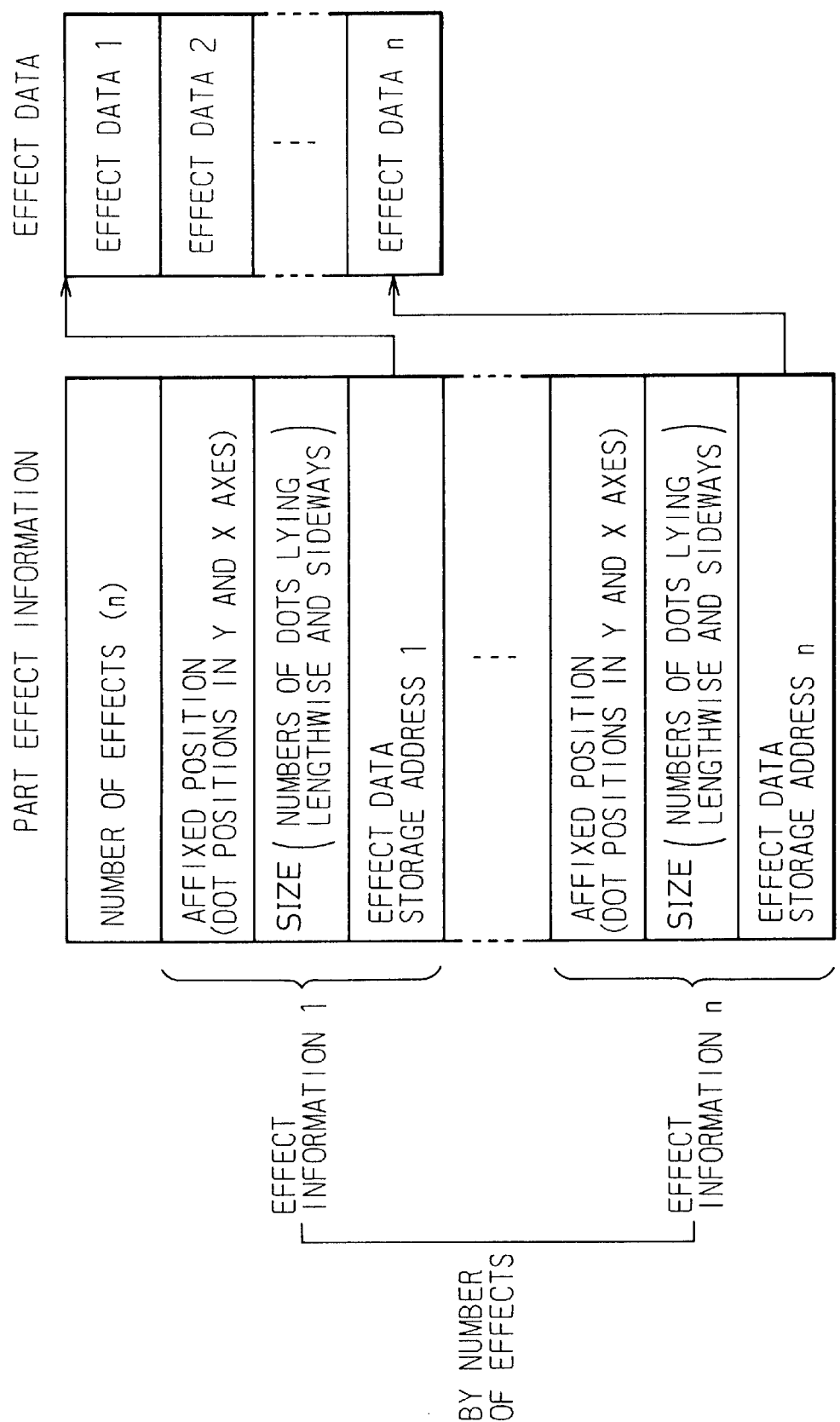

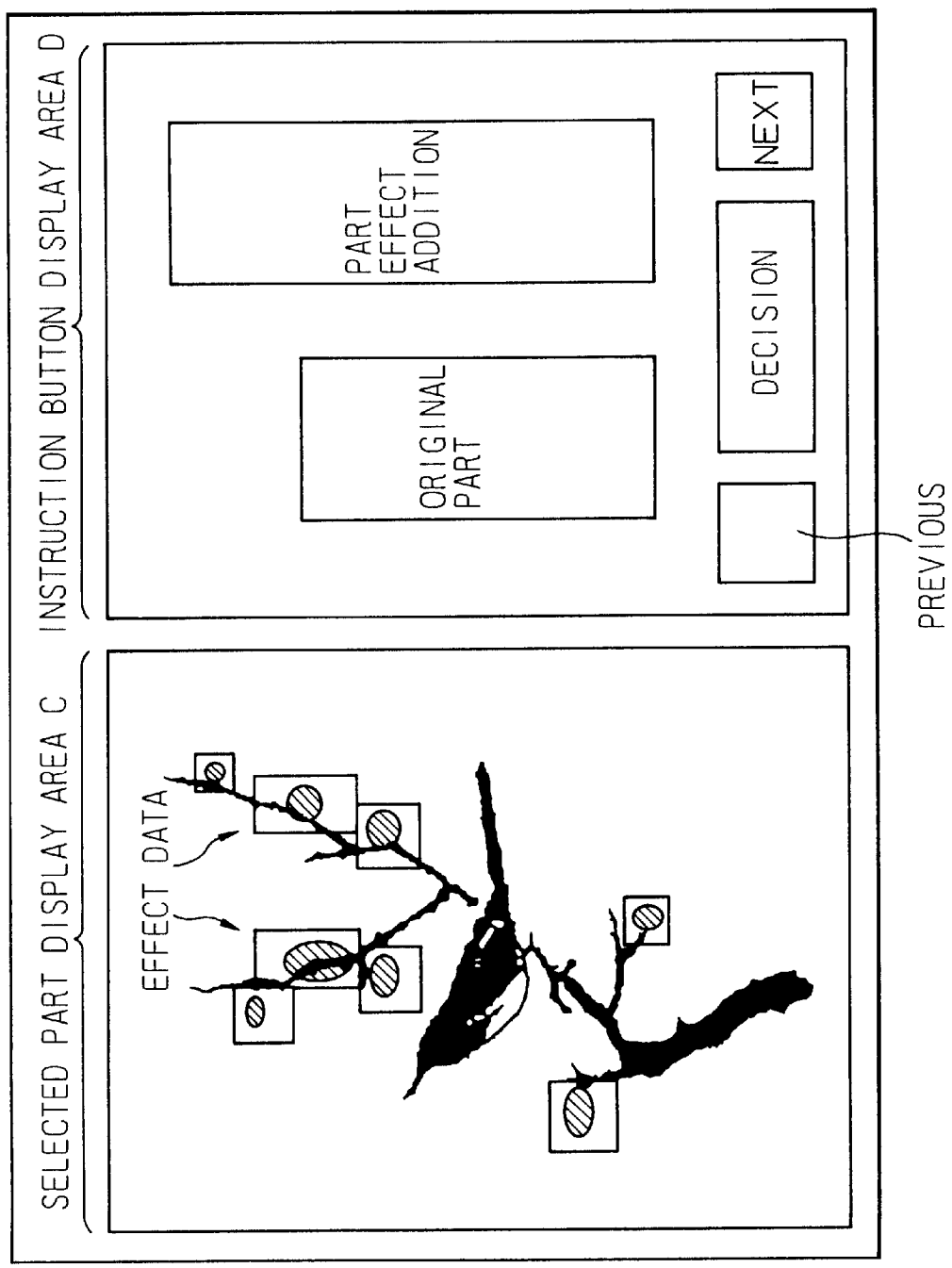

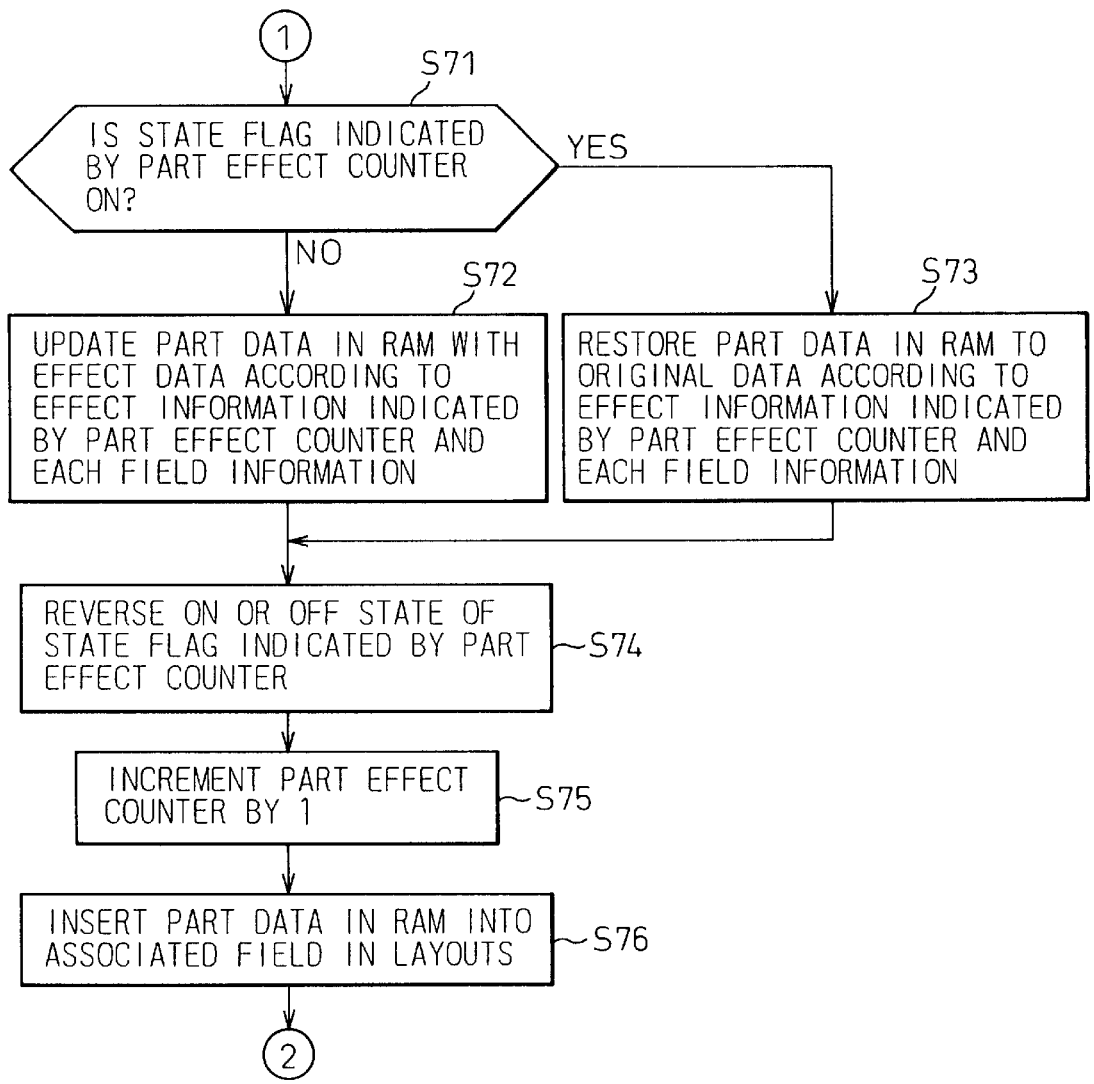

TWELVE ZODIACAL SIGNS

◧ MOUSE···1
◇ MOUSE···2
◇ COW···1
◇ COW···2
◇ TIGER···1
◇ TIGER···2
◇ RABBIT···1
◇ RABBIT···2
◇ RABBIT···3
◇ DRAGON···1
◇ DRAGON···2
◇ SNAKE···1
◇ SNAKE···2
◇ SNAKE···3
◇ SNAKE···4
◇ HORSE···1

SELECT ILLUSTRATION AND PRESS EXECUTION KEY

ILLUSTRATION POSTCARD CREATION
(ILLUSTRATION SELECTION)

Fig. 20
PRIOR ART

```
NEW YEAR'S CARD

◇   恭賀新年（筆）
         ◇   謹賀新年（筆）
         ◇   明けまして（筆）
         ◇   謹んで新年（筆）
         ◇   賀春（筆）
         ◇   迎春（筆）…1
         ▨   迎春（筆）…2
         ◇   賀正（筆）
         ◇   寿（筆）…1
         ◇   寿（筆）…2
         ◇   賀正
         ◇   明けまして…
         ◇   謹賀新年

SELECT TITLE AND PRESS EXECUTION KEY

ILLUSTRATION POSTCARD CREATION
(TITLE SELECTION)
```

SELECT GREETINGS AND PRESS　　　　　　NEW YEAR'S
EXECUTION KEY　　　　　　　　　　　　　CARD

ILLUSTRATION POSTCARD CREATION
(GREETINGS SELECTION)

DOCUMENT PROCESSING APPARATUS STORING AND MODIFYING DATA USING EFFECT DATA

CROSS REFERENCE TO RELATED APPLICATION

The subject application is related to application Ser. No. 08/736,729 filed Oct. 25, 1996 U.S. Pat. No. 5,930,811.

BACKGROUND OF THE INVENTION

1. Field of the Invention

The present invention relates to a document processing apparatus such as a word processor or personal computer capable of arbitrarily combining a sentence, an image and the like, laying them out, and printing them on a postcard (for example, a New Year's card or a postcard inquiring after one's health in the hot season) or other various kinds of cards (for example, a Christmas card).

2. Description of the Related Art

For designing a New Year's card using a word processor typical of a known document processing apparatus, processing is carried out according to, for example, the procedure described below.

(1) A layout screen is displayed, and a layout is selected from a list of layouts.

(2) A part is selected from a list of parts defined for each field in a layout in the screen, and then inserted into the selected layout with a position and size designated.

(3) When the inserted part must be corrected, a method is selected from a list of correction methods defined for each part.

(4) When insertion of parts is completed, the resultant data is stored in a flexible disk or the like.

(5) The data stored in the flexible disk is read and printed on a postcard.

The foregoing known apparatus has the problems described below.

(1) Even when it is intended to select a part for each field in a layout, since the list of parts is expressed with characters, the parts are indiscernible. This is inconvenient.

(2) Since parts are inserted into one layout that is regarded as an object, if the layout is requested to be changed to another, selection of a layout must be resumed and parts must be selected again. This is laborious and time-consuming.

(3) As for image data provided as a part by the document processing apparatus, an amount of one part data item is so large that the number of part data items to be stored in a storage means is limited. The number of items of parts a user can choose is therefore limited. For increasing the number of parts to be chosen by a user, a large-capacity storage unit is needed. Moreover, for handling data other than parts displayed as a list of parts by the apparatus as a part and inserting the data to a desired field, a user must create new data by carrying out editing. This is laborious and time-consuming.

SUMMARY OF THE INVENTION

Accordingly, an object of the present invention is to provide an apparatus for creating document data by inserting parts into a layout for a postcard or any other card, and to make it possible to process document data having any layout easily and shortly by simplifying a user's manipulation for selecting a layout or inserting parts into the selected layout, by enabling a user to increase the number of parts a user can choose as parts with a simple manipulation without an increase in storage capacity for parts, and by making information on a display screen discernible.

For accomplishing the above object, according to the present invention, there is provided a document processing apparatus having a layout data memory means for storing layout data used to lay out the contents of a document, and a part data memory means for storing part data of parts to be inserted into layouts, and creating a document using the data residing in both the memory means. The document processing apparatus comprises a layout/parts list display control means for giving control so as to define a layout area and parts list area in a screen on a display means on the basis of the data residing in the layout data memory means and part data memory means, display one layout or a plurality of layouts in the layout area, and display a list of parts to be inserted into the layouts in the parts list area; a part insertion means that when one part is selected from the list of parts displayed in the parts list area, inserts the part to associated fields in all the layouts displayed in the layout area; an effect data memory means for storing effect data used to modify the part data; and a modification means for modifying the part data using the effect data.

BRIEF DESCRIPTION OF THE DRAWINGS

Further features and advantages of the present invention will be apparent from the following description with reference to the accompanying drawings, in which:

FIGS. 10A and 10B are explanatory diagrams of part effect information and effect data, FIG. 10A shows a part effect information table, and FIG. 10B shows part effect information and effect data concerning one part;

FIG. 13 is an explanatory diagram of a screen resulting from part effect addition;

FIGS. 14A and 14B are flowcharts describing third part effect addition;

FIG. 20 shows a title selection screen in accordance with the prior art;

FIG. 22 shows a greetings selection screen in accordance with the prior art.

DESCRIPTION OF THE PREFERRED EMBODIMENTS

Before describing the preferred embodiments according to the present invention, an example of the related art is provided with reference to FIGS. 16 to 23.

A practical procedure of, for example, designing a New Year's card in Japanese using a word processor which has been adopted in the past is as described below.

(1) First, a selection screen for selecting any of various kinds of processing from a menu is displayed as an initial screen on the display screen of the word processor. If a menu item of postcard creation, for example, "Postcard Maker" is selected in the screen, a layout selection screen shown in FIG. 16 appears. In the layout selection screen, a list of various layouts such as a layout for "vertical writing with a postcard placed lengthwise," a layout for "lateral writing with a postcard placed lengthwise," a layout for "vertical writing with a postcard placed sideways," and a layout for "lateral writing with a postcard placed sideways" is displayed. In this example, layouts each formed with a combination of a title 1, illustration 2, and text 3 are displayed. When any one of the layouts is selected in the layout selection screen, the layout is displayed.

Figure 17:
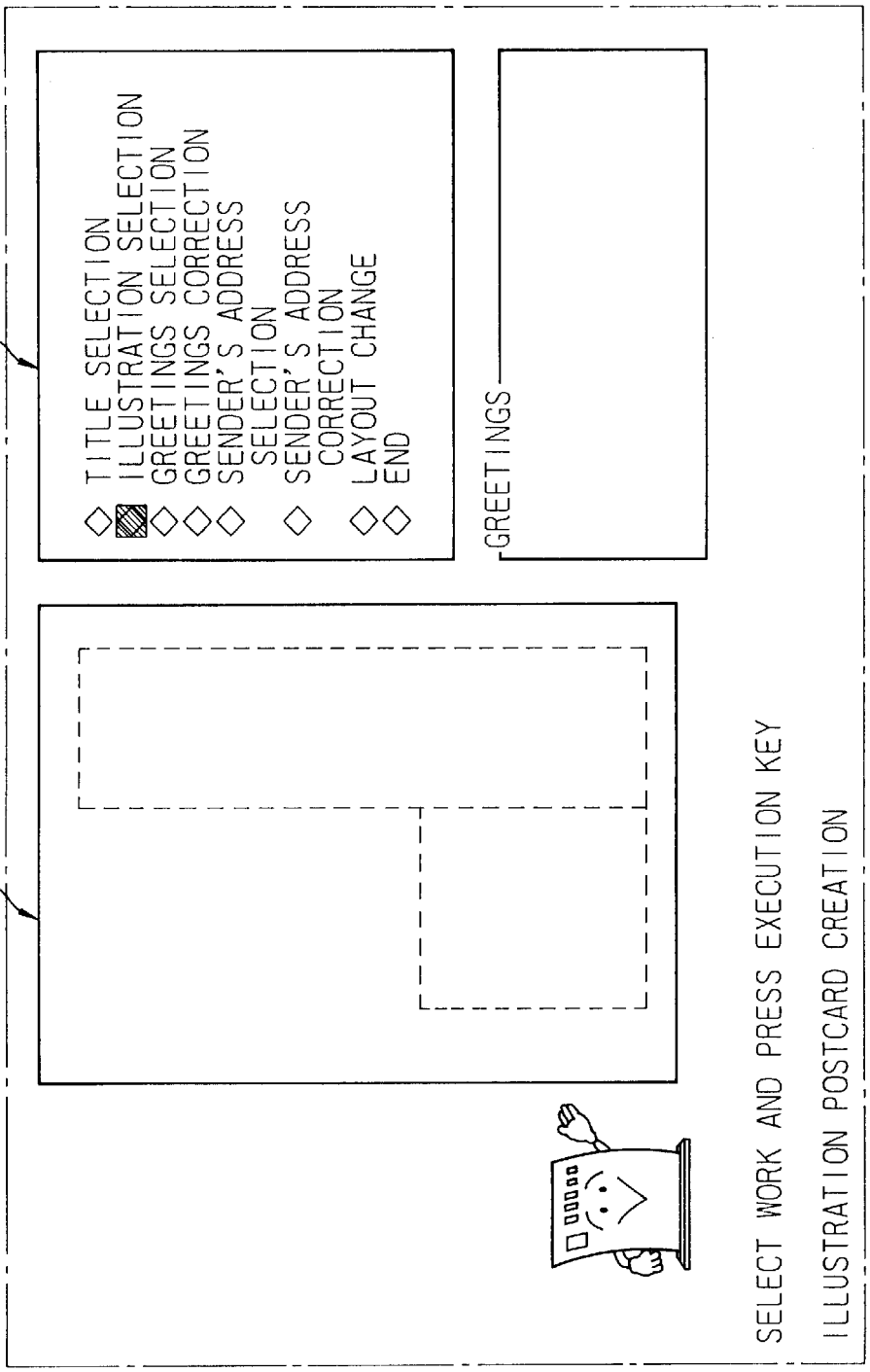
FIG. 17 shows a work selection screen (part 1) in accordance with the prior art.

(2) When the layout is thus selected, a work selection screen (part 1) shown in FIG. 17 appears. In this work selection screen (part 1), the selected one layout is displayed and a work menu from which a subsequent work is selected is displayed. The work menu contains "Title Selection," "Illustration Selection," "Greetings Selection," and so on.

Figure 18:
FIG. 18 shows an illustration selection screen in accordance with the prior art.

(3) When "Illustration Selection" is selected from the work menu, an illustration selection screen shown in FIG. 18 appears. In this screen, characters expressing twelve zodiacal signs (mouse, cow, tiger, etc.) are displayed in order to enable display of illustrations.

Figure 19:
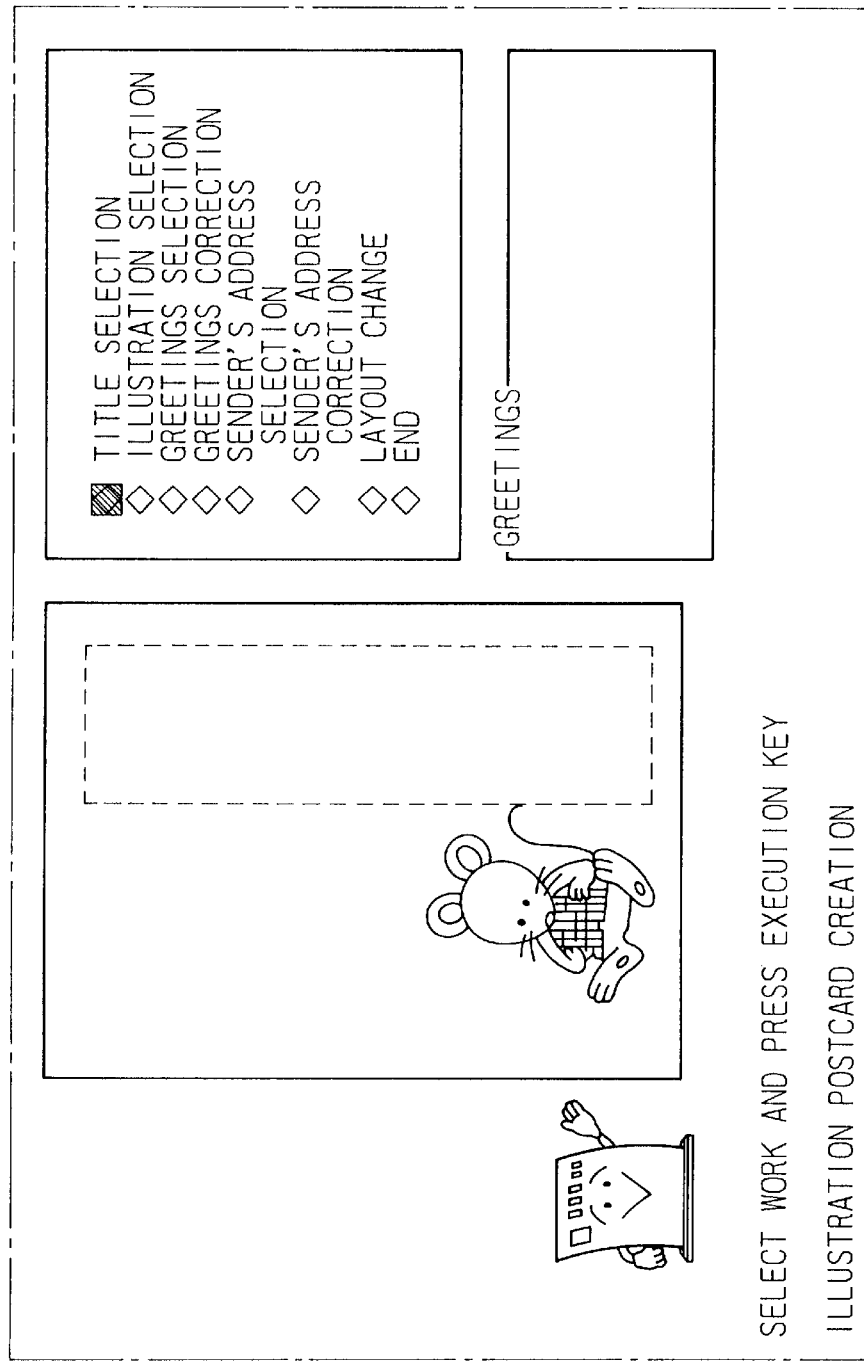
FIG. 19 shows a work selection screen (part 2) in accordance with the prior art.

(4) When, for example, "Mouse 1" is selected in the illustration selection screen, the illustration of the selected "Mouse 1" appears in a given field in the layout in a work selection screen (part 2) shown in FIG. 19. A subsequent work can be selected in the work selection screen,(part 2).

(5) When "Title Selection" is selected from the menu in the work selection screen (part 2) shown in FIG. 19, a title selection screen for a New Year's card shown in FIG. 20 appears. In the title selection screen, various tiles written in Japanese are displayed.

Figure 21:
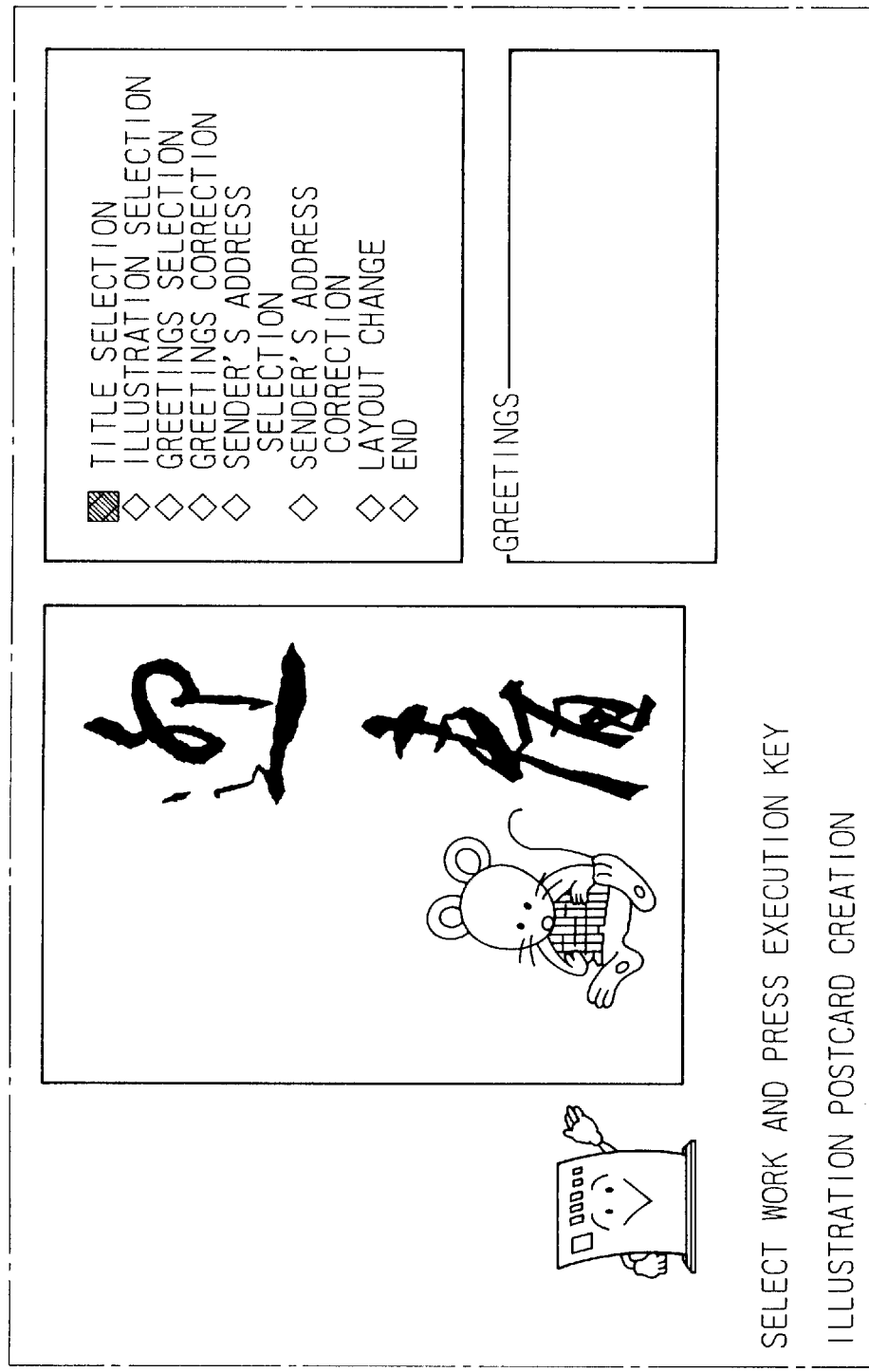
FIG. 21 shows a work selection screen (part 3) in accordance with the prior art.

(6) When, for example, a certain title is selected in the title selection screen, the title (Japanese) appears together with the illustration of the selected "Mouse 1" in a work selection screen (part 3) shown in FIG. 21.

(7) Thereafter, when "Greetings Selection" is selected from the menu in the work selection screen (part 3) shown in FIG. 21, a greetings selection screen shown in FIG. 22 appears. In the greetings selection screen, a menu of various greetings written in Japanese and used as texts to be entered in a New Year's card is displayed.

Figure 23:
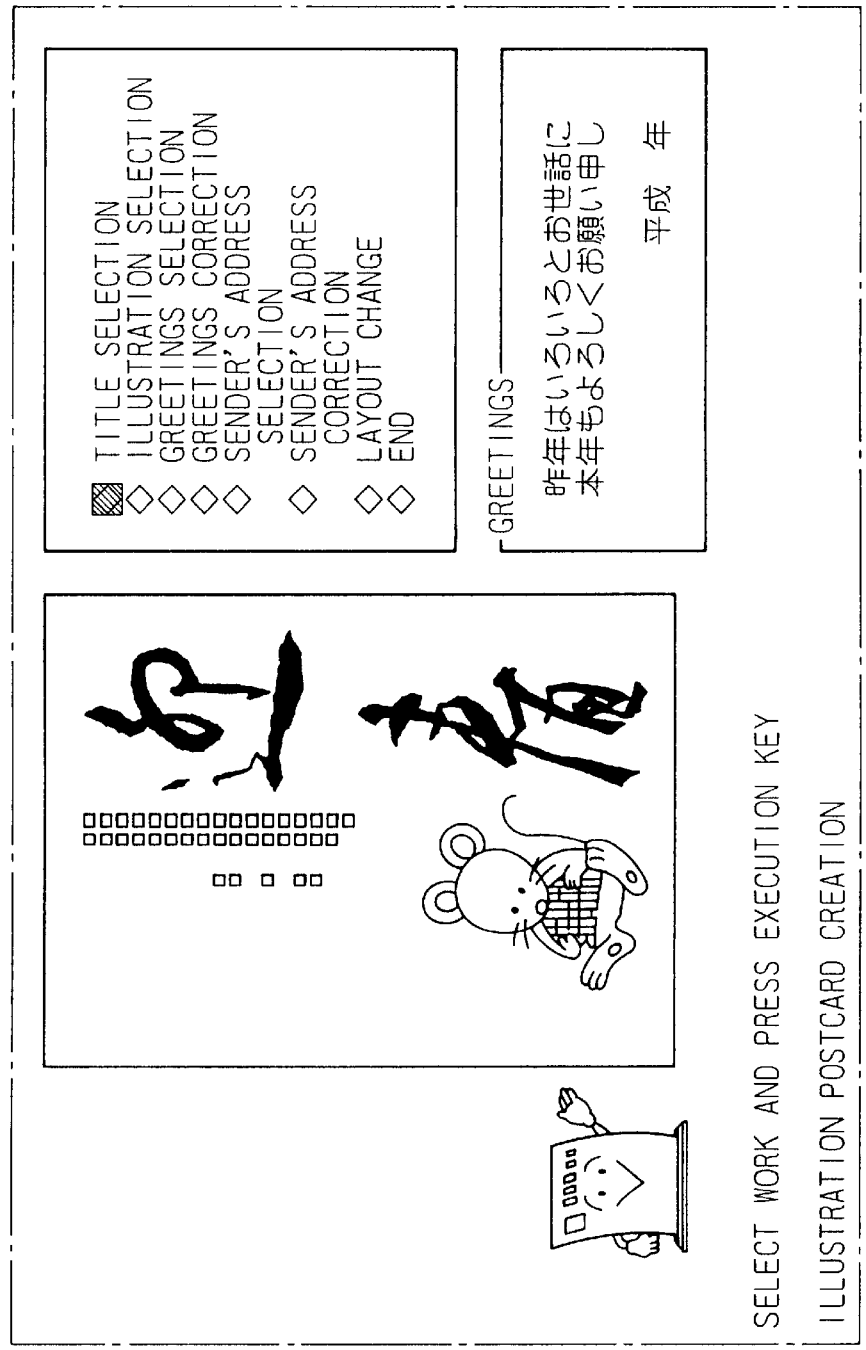
FIG. 23 is a work selection screen (part 4) in accordance with the prior art.

(8) When any greetings is selected in the greetings selection screen, the selected illustration, title, and greetings appear in a work selection screen (part 4) shown in FIG. 23. Thereafter, when the parts of the inserted illustration, title, and greetings must be corrected, a correction method is selected from a list of correction methods defined for each part.

A document for a New Year's card can be created by carrying out the foregoing processing.

However, as mentioned above, the known apparatus has the problems described below.

(1) When it is intended to select a part for each field in a layout, since the list of parts is expressed with characters, the parts are indiscernible. This is inconvenient.

(2) Since parts are inserted into one layout regarded as an object, when the layout should be changed to another, layout selection must be resumed and parts must be selected again. This is laborious and time-consuming.

(3) As for image data provided as a part by the document processing apparatus, an amount of one part data item is so large that the number of part data items to be stored in a storage unit is limited. The number of items of parts a user can choose is therefore limited. For increasing the number of parts a user can choose, a large-capacity storage unit is needed. Moreover, for handling data of a part other than those displayed as a list of parts by the apparatus as a part and inserting it into a desired field, a user must create new data by carrying out editing. This is laborious and time-consuming.

Figure 1:
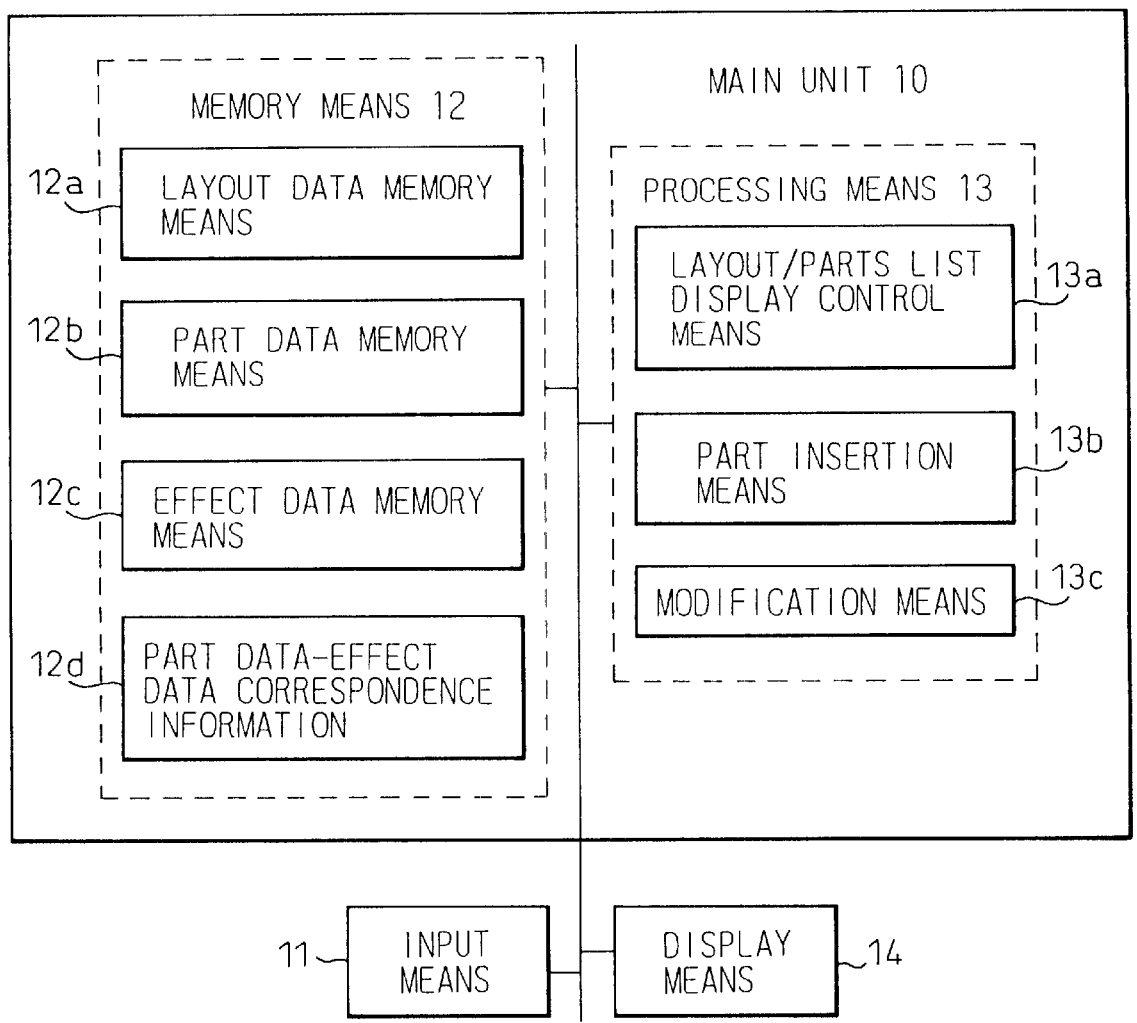
FIG. 1 is a diagram for explaining the principles of the present invention.

Next, the configuration based on the principles of the present invention devised to solve the aforesaid problems will be described. FIG. 1 is a diagram for explaining the principles of the present invention. As illustrated, a document processing apparatus in accordance with the present invention comprises a layout data memory means 12$a$ for storing layout data used to lay out the contents of a document, and a part data memory means 12$b$ for storing part data of parts to be inserted into layouts, and creates a document on the basis of the data residing in the memory means 12$a$ and 12$b$. The document processing apparatus further comprises a layout/parts list display control means 13$a$ for giving control so as to define a layout area and a parts list area in a screen on a display means 14 on the basis of the data residing in the layout data memory means 12$a$ and part data memory means 12$b$, display one layout or a plurality of layouts in the layout area, and display a list of parts to be inserted into the layouts in the parts list area; a part insertion means 13$b$ that, when one part is selected from the list of parts displayed in the parts list area, inserts the part to associated fields in all the layouts displayed in the layout area; an effect data memory means 12$c$ for storing effect data used to modify the part data; and a modification means 13$c$ for modifying the part data using the effect data.

According to the second aspect of the present invention, preferably, the modification means 13$c$ in the document processing apparatus uses effect data to modify a part inserted into a field in a selected layout.

According to the third aspect of the present invention, preferably, the modification means 13$c$ in the document processing apparatus uses effect data to modify a part inserted into associated fields in all the layouts displayed in the layout area by the part insertion means.

According to the fourth aspect of the present invention, preferably, the modification means 13c in the document processing apparatus uses effect data to modify the parts displayed in the parts list area.

According to the fifth aspect of the present invention, preferably, in the document processing apparatus, a plurality of effect data items are prepared for each part data item. The modification means 13c determines an effect data item to be used for modification according to an instruction entered at an input means 11.

According to the sixth aspect of the present invention, preferably, the modification means 13c in the document processing apparatus determines effect data to be used for modification according to the number of instructions entered at the input means 11.

According to the seventh aspect of the present invention, preferably, the modification means 13c in the document processing apparatus determines effect data to be used for modification according to the time during which an instruction is entered continuously at the input means 11.

According to the eighth aspect of the present invention, preferably, the document processing apparatus provides correspondence information concerning the correspondence between the effect data and part data. The modification means 13c modifies part data using effect data selected on the basis of the correspondence information.

As mentioned above, in an apparatus for creating document data by inserting parts into a layout for a postcard or any other card, a user's manipulation of selecting a layout or inserting parts into the selected layout can be simplified. A user's manipulation for instructing modification to be carried out using effect data that is used to modify part data and is smaller in amount than the part data is as simple as mentioned above. The number of parts a user can choose actually can be increased with a user's simple manipulation without an increase in storage capacity for parts. Furthermore, since information can be discerned on a display screen, document data having any layout can be processed easily and quickly.

Embodiments of the present invention will be described in conjunction with the drawings below. The embodiments to be described below are examples in which the document processing apparatus of the present invention is adapted to a word processor (which hereinafter may be referred to simply as an apparatus). The description will proceed on the assumption that the constituent features of the present invention are used to create a document. A title, illustration, and text (for example, greetings) to be inserted into each layout shall be termed "parts."

Figure 2:
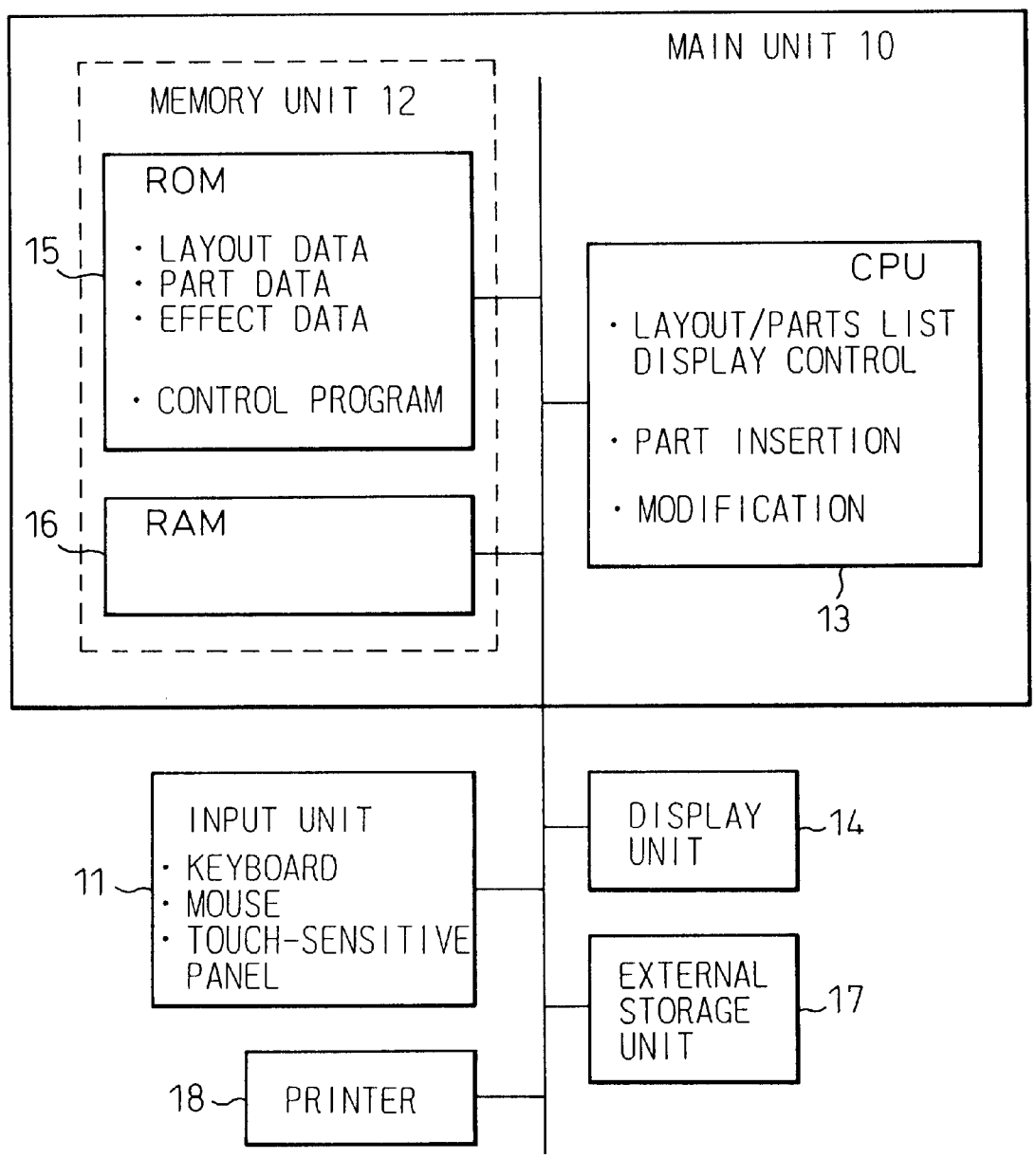
FIG. 2 is a diagram showing the configuration of an apparatus of an embodiment.
Figure 3:
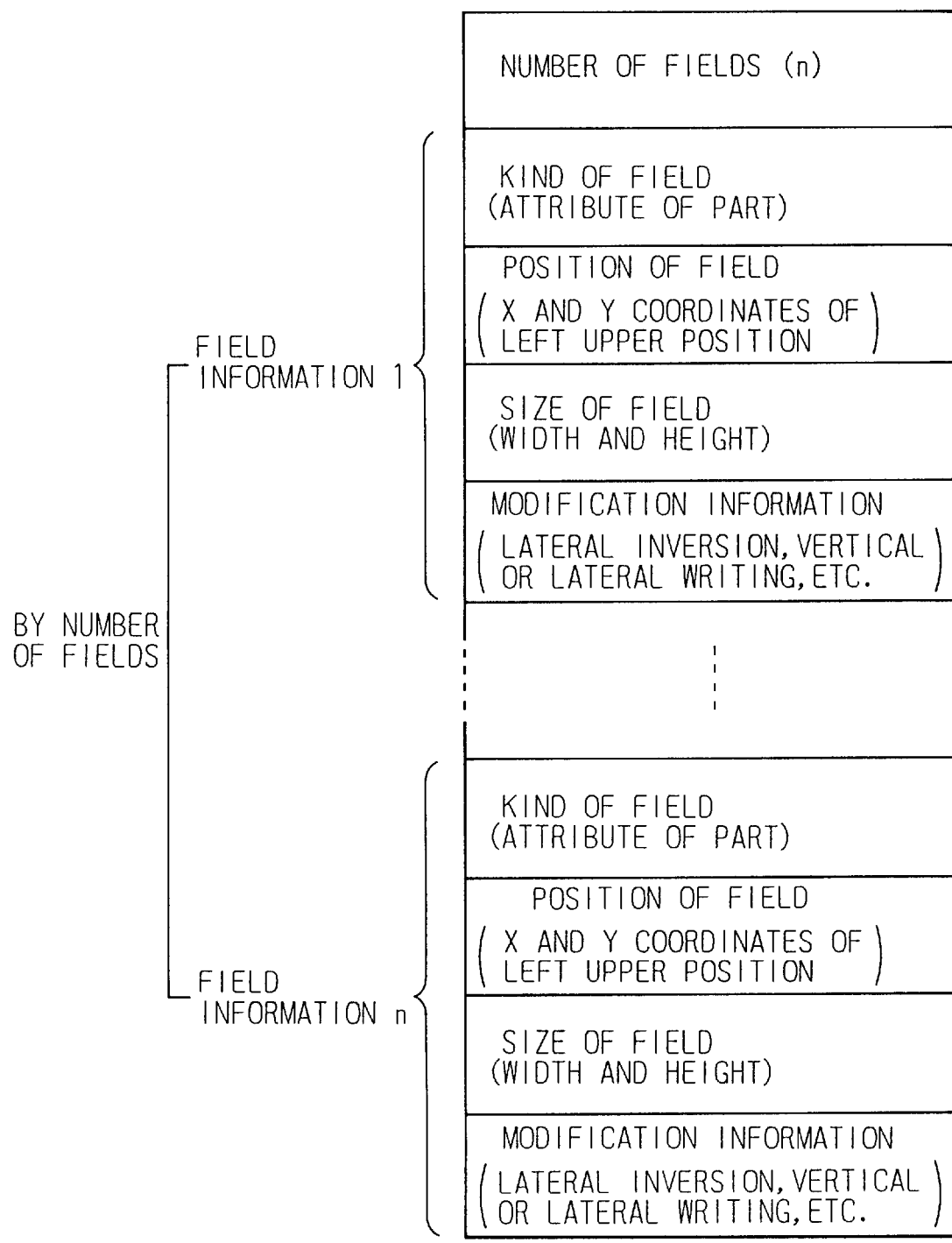
FIG. 3 is a schematic diagram of layout data.

FIG. 2 is a diagram showing the configuration of an apparatus in accordance with an embodiment and FIG. 3 is a schematic diagram of layout data.

The apparatus of the embodiment comprises a main unit 10, and an input unit 11, display unit 14, external storage unit 17, and printer 18 which are connected to the main unit 10. The main unit 10 includes a CPU 13 and a memory unit 12. The memory unit 12 is composed of a ROM 15 and a RAM 16. The abilities of the components will be described below.

The input unit 11 is formed with a mouse, touch-sensitive panel (that is an input unit placed on the display screen of the display unit, used to detect a press made by a finger or pen and to locate an indicated position on the display screen on the basis of the pressed position), keyboard, or the like, and used to instruct various selections, enter data, enter control information, or the like. The drawings concerning this embodiment show an example using the touch-sensitive panel.

The display unit 14 displays data processed by the main unit 10. The display unit 14 of this embodiment includes a liquid-crystal display panel, and a touch-sensitive panel is placed on the liquid-crystal display panel. Necessary information can be input by touching any position on the screen of the liquid-crystal display panel, that is, on the touch-sensitive panel.

The ROM 15 is a nonvolatile memory for storing layout data, part data, and control programs to be run by the CPU 13. The layout data stored in the ROM 15 is, as shown in FIG. 3, composed of the number of fields (n) in a layout to be processed and the same number of field information items as the number of fields (n).

Each field information is composed of such information as a kind of field (information including what attribute a part to be inserted has), a field position that is a left upper position of a rectangular field indicated with Y and X coordinates, the size of a field indicated with a height and width, modification information indicating a kind of modification to be performed on a part to be inserted into a field (lateral inversion, vertical inversion, rotation by any angle, vertical or lateral writing, etc.).

The CPU 13 serves as a processor for giving various kinds of control within the main unit 10 by running the control programs stored in the ROM 15.

The RAM 16 is a memory used as a work area by the CPU 13. Composition of a document to be described below is carried out within the RAM 16.

The external storage unit 17 is a floppy disk drive, hard disk drive, magneto-optical disk drive, or CD-ROM drive. The layout data, part data, and control programs stored in the ROM 15 may be stored in the external storage unit 17, and thus the external storage unit 17 may be substituted for the ROM 15.

The printer 18 prints data output from the main unit 10 on a printing medium.

The document processing apparatus may be configured so that control programs are loaded from the external storage unit 17 to the RAM 16 at the startup of the document processing apparatus, and the CPU 13 operates according to the control programs in the RAM 16. In this case, the programs can be supplied to the document processing apparatus through a portable storage medium or over a line.

Figure 4:
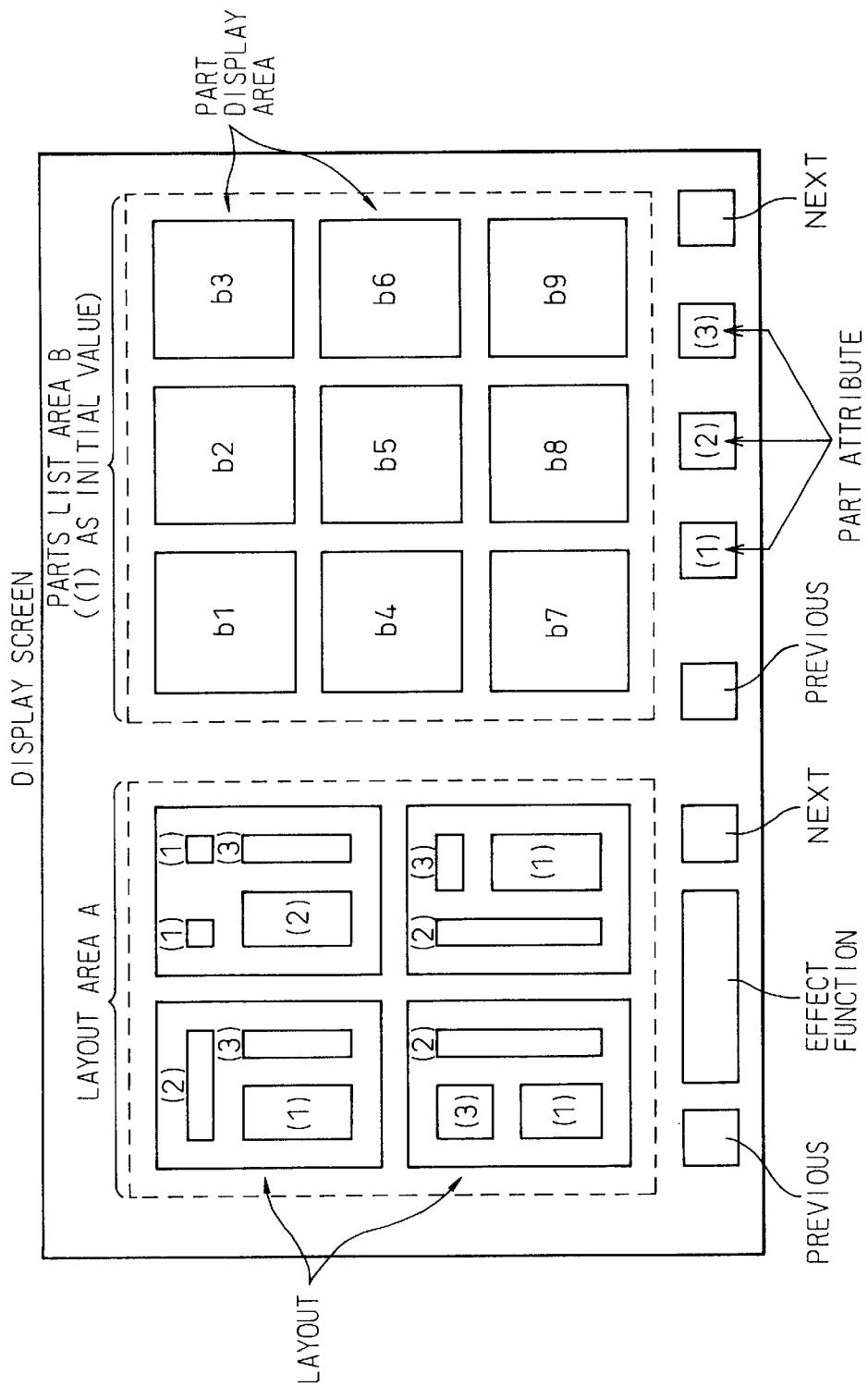
FIG. 4 is an explanatory diagram of a layout/parts list screen in accordance with the embodiment.
Figure 5:
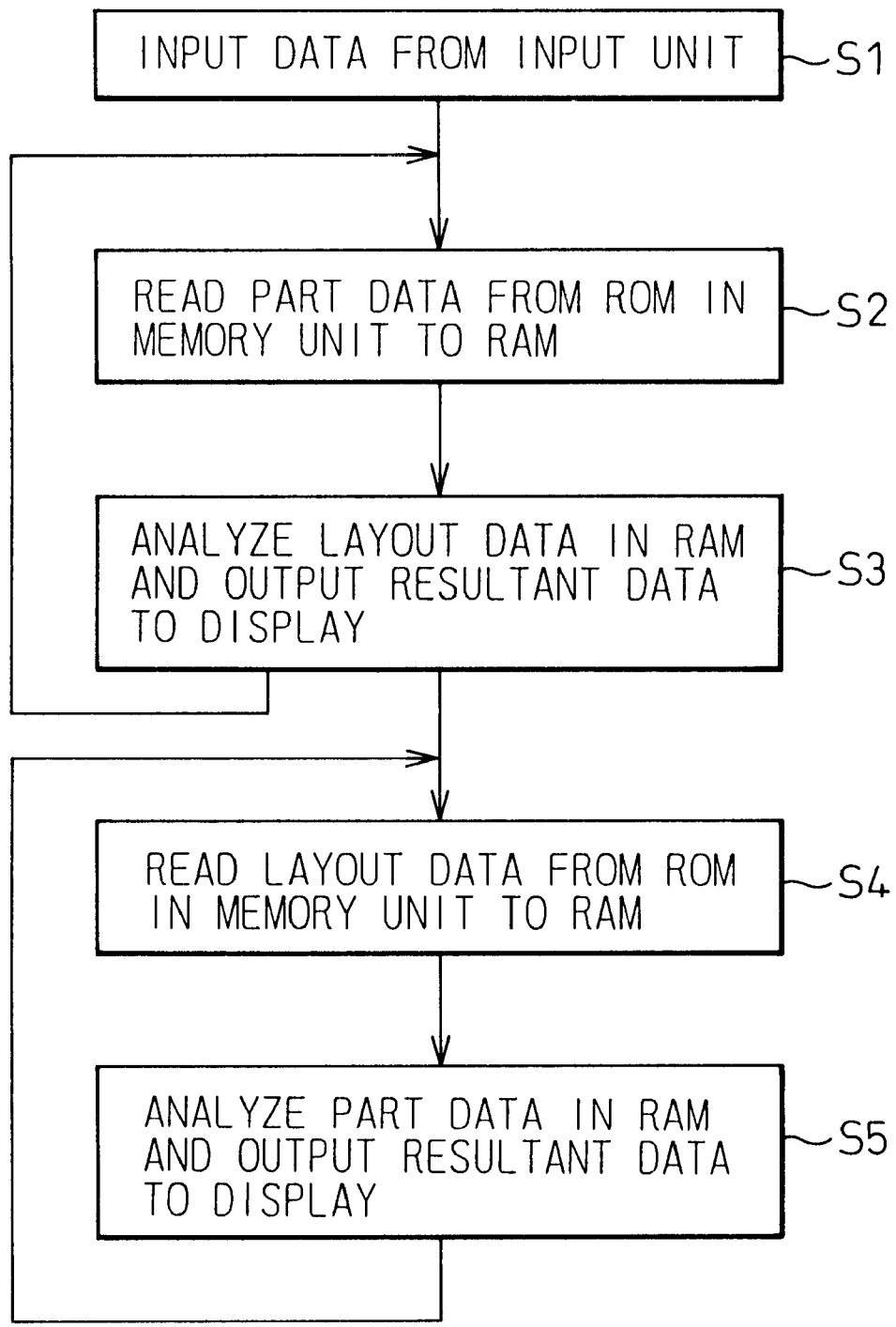
FIG. 5 is a flowchart describing display of the layout/parts list screen in accordance with the embodiment.

FIG. 4 is an explanatory diagram of a layout/parts list screen, and FIG. 5 is a flowchart describing display of the layout/parts list screen. Basic processing (display of the layout/parts list screen) will be described in conjunction with FIGS. 4 and 5. S1 to S5 denotes processing steps.

In the apparatus, for example, when the constituent features of the present invention are used to create a document to be printed on a New Year's card, a user can create the document automatically by selecting a menu item from a menu appearing in each of screens starting with an initial screen that is not shown. An example of a procedure taken by the user will be described below.

First, a processing item for creating a document using the constituent features of the present invention is selected from a menu in a function selection screen displayed as an initial screen on the display screen of the display unit 14 that is not shown.

By selecting the processing item, a layout/parts list screen (screen containing layouts and a list of parts) shown in FIG. 4 is displayed on the display screen of the display unit 14. In the layout/parts list screen, section A of the screen (left part of FIG. 4) is defined as a layout area, and section B thereof (right part of FIG. 4) is defined as a parts list area. A plurality of layouts (for example, layouts for a New Year's card) are displayed in the layout area A, and a list of parts (a list of parts to be inserted into layouts) is displayed in the parts list area B.

In the layout area A, images showing "Next" and "Previous" are displayed. In the parts list area B, images showing "Previous," "Part Attribute (1)," "Part Attribute (2)," "Part Attribute (3)," and "Next" are displayed. These displayed images shall be referred to as buttons.

In this case, the Next button is a button used to display data of the next page that is not displayed on the display screen of the display unit 14. The Previous button is a button used to display data of a previous page that is not displayed on the display screen.

In the parts list area B, a plurality of part display areas b1, b2, b3, etc., and b9 are defined. Parts having a part attribute designated by a user are displayed in part display areas. The buttons of Part Attributes (1), (2), and (3) defined in the parts list area B are used to select a part attribute. Parts having a part attribute selected by pressing any of the buttons are displayed in the part display areas b1, b2, b3, etc., and b9. In this example, part attribute (1) is an illustration, part attribute (2) is a title, and part attribute (3) is text (for example, greetings).

With selection of a part attribute, the contents of the layout/parts list screen change sequentially. In the initial screen of the layout/parts list screen, a plurality of layouts alone are displayed in the layout area in section A (no part is displayed), and parts having part attribute (1) (illustration) are displayed in the parts list area.

In this case, the fields in layouts displayed in the layout area A bear numerals (1), (2), or (3). The kinds of the fields are associated with part attributes (1), (2), and (3). For example, fields (1) are fields into which parts having part attribute (1) are inserted, fields (2) are fields into which parts having part attribute (2) are inserted, and fields (3) are fields into which parts having part attribute (3) are inserted.

In this screen, when the displayed Previous button is pressed, data of a previous page that is not displayed on the display screen of the display unit 14 appears. When the Next button is pressed, data of the next page that is not displayed on the display screen of the display unit 14 appears. Specifically, when layouts or a list of parts occupies a plurality of pages, a user can see a previous or subsequent page by pressing the Previous button or Next button.

For creating a document by selecting a processing item for executing functions that are the constituent features of the present invention, first, the layout/parts list screen is displayed on the display unit 14 as basic processing. In this case, the basic processing is carried out under the control of the CPU 13 as described below (See FIG. 5).

When selection information or information concerning selection of the processing item for executing the functions that are the constituent features of the present invention is entered at the input unit 11 with a user's manipulation (step S1), the CPU 13 reads layout data, which is shown in FIG. 3, stored in the ROM 15 in the memory unit 12, and stores the data in the RAM 16 (step S2).

For detecting selection of the processing item, a press made on the touch-sensitive panel that is the input unit 11 is detected, and it is judged whether or not a processing item displayed at a position in a screen corresponding to the pressed position is the processing item using the functions that are the constituent features of the present invention.

The CPU 13 then reads and analyzes layout data stored in the RAM 16, develops the read data into depiction data expressing fields on the basis of field information contained in the layout data, outputs the depiction data to the display unit 14, and thus depicts the fields in the layout area A defined in the screen (step S3). The CPU 13 repeats layout display of steps S2 and S3 by the same number of times as the number of layouts that can be displayed in one screen (one page). Thus, layouts are displayed in the layout area in section A of the screen shown in FIG. 4.

When the above processing is completed, the CPU 13 reads part data stored in the ROM 15 in the memory unit 12 and stores the part data in the RAM 16 (step S4).

The CPU 13 then reads and analyzes part data stored in the RAM 16, develops the part data into depiction data that can be displayed on the display unit 14, and outputs the depiction data to the display unit 14 (step S5). In this case, since an initial value of a part attribute for a list of parts is set to part attribute (1), developed data of part data having part attribute (1) (illustration) is output to the display unit 14.

The CPU 13 repeats part display of steps S4 and S5 by the same number of times as the number of parts that can be displayed in one screen. Thus, a list of parts is displayed in section B of the screen shown in FIG. 4.

As mentioned above, after a list of layouts is displayed in section A on the display screen of the display unit 14 and a list of parts is displayed in section B, if a user presses the Previous or Next button displayed in the layout area A, the CPU 13 reads layout data from a different address in the ROM 15 according to the pressed button, stores the layout data in the RAM 16, analyzes the layout data by carrying out the same processing as step S3, outputs developed depiction data to the display unit 14, and displays the different layout data in the layout area. In this case, part data displayed in the parts list area B is not changed.

When the Previous or Next button displayed in the parts list area B is pressed, the CPU 13 reads part data from another address in the ROM 15 according to the pressed button, and stores the part data in the RAM 16. By carrying out the same processing as step S5, depiction data into which the part data is developed is output to the display unit 14, and the different part data is displayed in any of the part display areas in the parts list area B. At this time, the layout data displayed in the layout area A is not changed.

As mentioned above, when part attribute (1) is selected, if the button for selecting part attribute (2) or (3) that is different from the current part attribute is pressed, the CPU 13 carries out the same processing as steps S4 and S5. Specifically, part data having the part attribute associated with the pressed button is read from the memory unit such as the ROM into the RAM, analyzed, and developed into depiction data. The depiction data is then output to the display unit 14. With this processing, parts having the selected part attribute are displayed in the part display areas b1 to b9 in the parts list area B.

Figure 6:
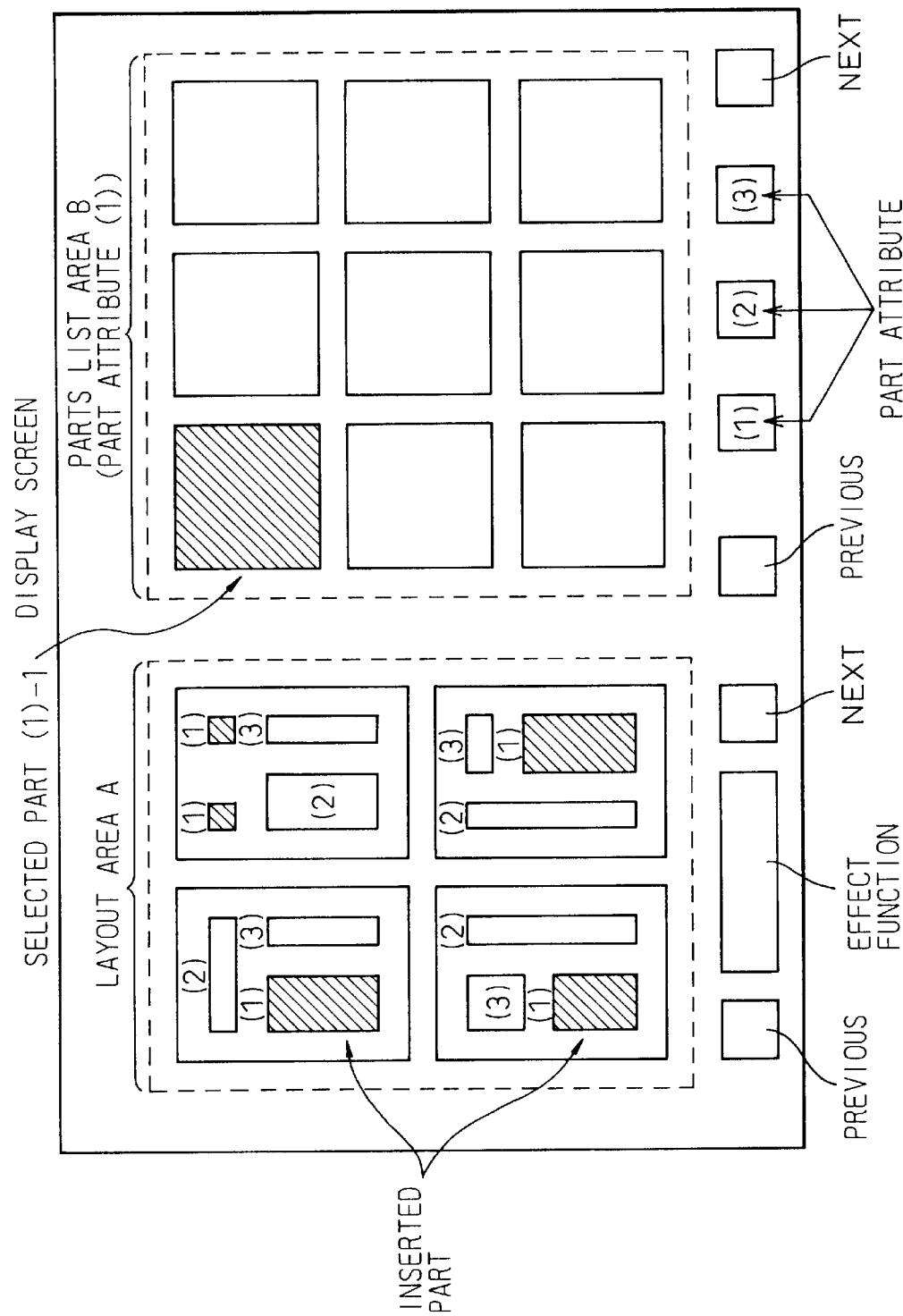
FIG. 6 is an explanatory diagram of a part insertion screen in accordance with the embodiment.
Figure 7:
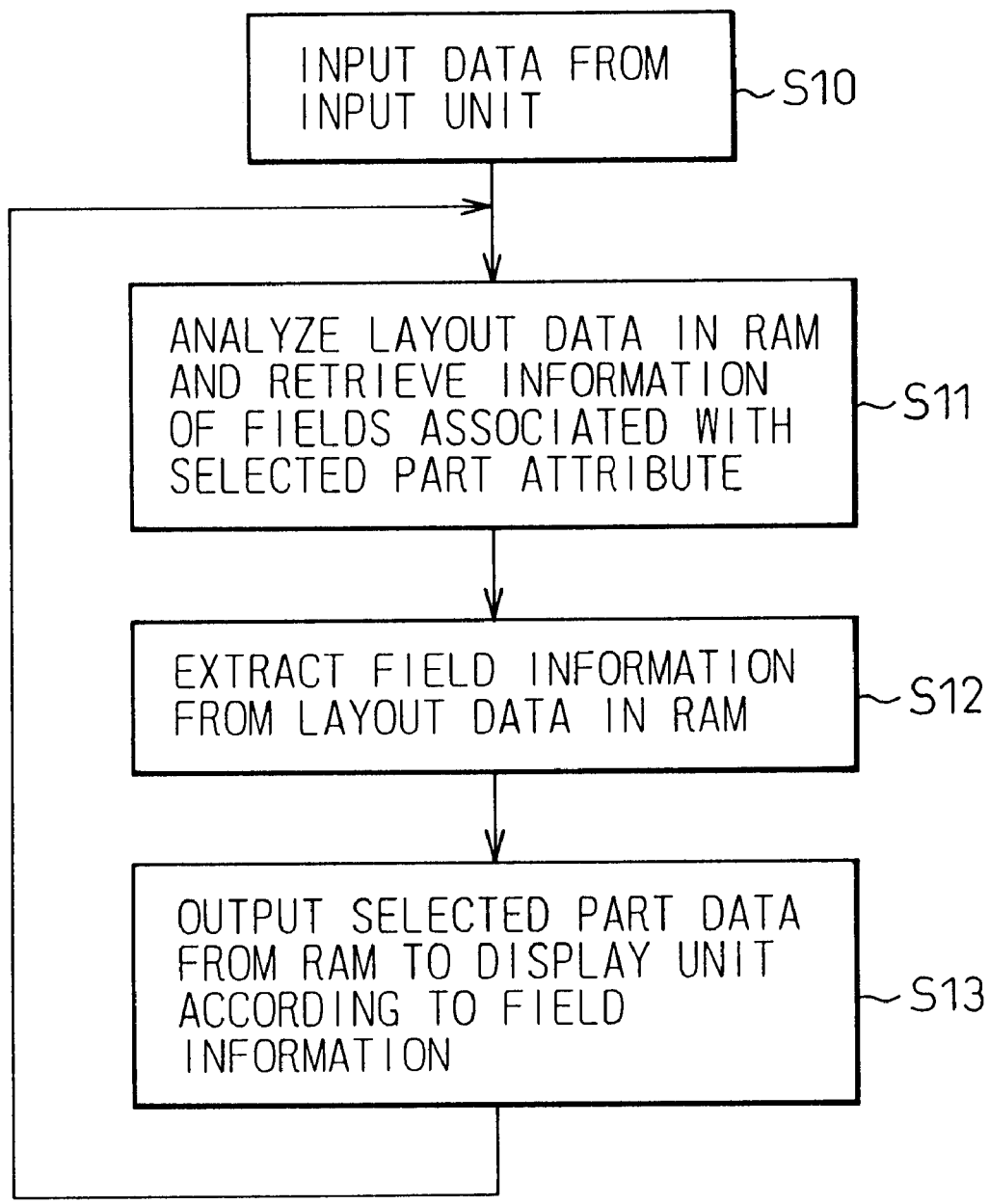
FIG. 7 is a flowchart of part insertion in accordance with the embodiment.

FIG. 6 is an explanatory diagram of a part insertion screen, and FIG. 7 is a flowchart describing part insertion. Part insertion will be described in conjunction with FIGS. 6 and 7. S10 to S13 denote processing steps.

After any part attribute is selected and parts having the part attribute are displayed as mentioned above, when one part is selected from the list of parts, the selected part is inserted into fields associated with the selected part attribute in all the layouts displayed in the layout area A according to modification information (lateral inversion, vertical or lateral writing, etc.) contained in field information.

Specifically, in the part insertion screen, when one of the parts displayed in the parts list area (hatched part of FIG. 6) is selected, the selected part is inserted into associated fields (part insertion areas) in all the layouts in the layout area (in FIG. 6, a hatched part of the parts list area indicates the selected part, hatched parts of the layouts in the layout area indicate the fields into which the selected part is inserted).

For example, when one part (for example, part (1)-1) is selected with parts of part attribute (1) (illustration) displayed in the parts list area, the part is inserted into associated fields (insertion areas associated with part attribute (1)) in all the layouts displayed in the layout area.

For part insertion, the CPU 13 proceeds with the processing in response to a user's manipulation (See FIG. 7). As mentioned previously, one part (for example, part (1)-1 in FIG. 6) is selected with a user's manipulation made at the input unit 11 with parts having any attribute displayed, and the selection information is input (step S10). The CPU 13 then reads and analyzes layout data stored in the RAM 16. The CPU 13 retrieves information of associated fields (fields associated with attribute (1)) in the layouts displayed in the layout area A (step S11).

For detecting selection of the part, a press made on the touch-sensitive panel that is the input unit 11 is detected. It is then judged whether or not a part is displayed at a position in the screen corresponding to the pressed position, and the part displayed at the position is specified.

The CPU 13 then extracts the information of the associated fields in the layouts from the layout data in the RAM 16 (step S12). The information includes a position and size of each field to which a part is output (See FIG. 3). The CPU 13 outputs the selected part data (data of part (1)-1) from the RAM 16 to the display unit 14 according to the field information (step S13).

The CPU 13 repeats the processing of steps S11, S12, and S13 by the same number of times as the number of layouts displayed in one screen. As a result of the repetition, all the fields, of which field information specifies the current part attribute, in the layouts in the layout area A are displayed on the display unit 14 with the part inserted thereinto.

Even when another part is selected with the part inserted into the fields in the layouts, the same processing as the foregoing one is carried out. The part currently inserted into the fields is replaced with the selected part, and the fields are displayed with the selected part inserted thereinto.

Furthermore, a user can insert a desired part having any part attribute into associated fields in all the layouts displayed in the layout area by making a manipulation for switching part attributes and executing part insertion.

When a part is selected as mentioned above and inserted into associated fields in layouts, if the CPU 13 detects that the Previous or Next button in the layout area A is pressed by a user, the CPU 13 carries out processing described below.

When it is detected that the Previous or Next button is pressed, the same processing as the aforesaid one is carried out in order to read layout data stored in the ROM 15 according to the pressed button and store the layout data in the RAM 16.

Thereafter, the CPU 13 uses field information contained in each layout data stored in the RAM 16 to depict a layout in the layout area A. At this time, when a part has been selected as mentioned above, data of a layout having the selected part inserted into an associated field is developed into depiction data, and output to the display unit 14.

This processing is repeated by the same number of times as the number of layouts displayed in the layout area A. Thus, layouts are switched and displayed.

Part effect addition will be described in conjunction with FIG. 6 and FIGS. 8 to 10.

Figure 8:
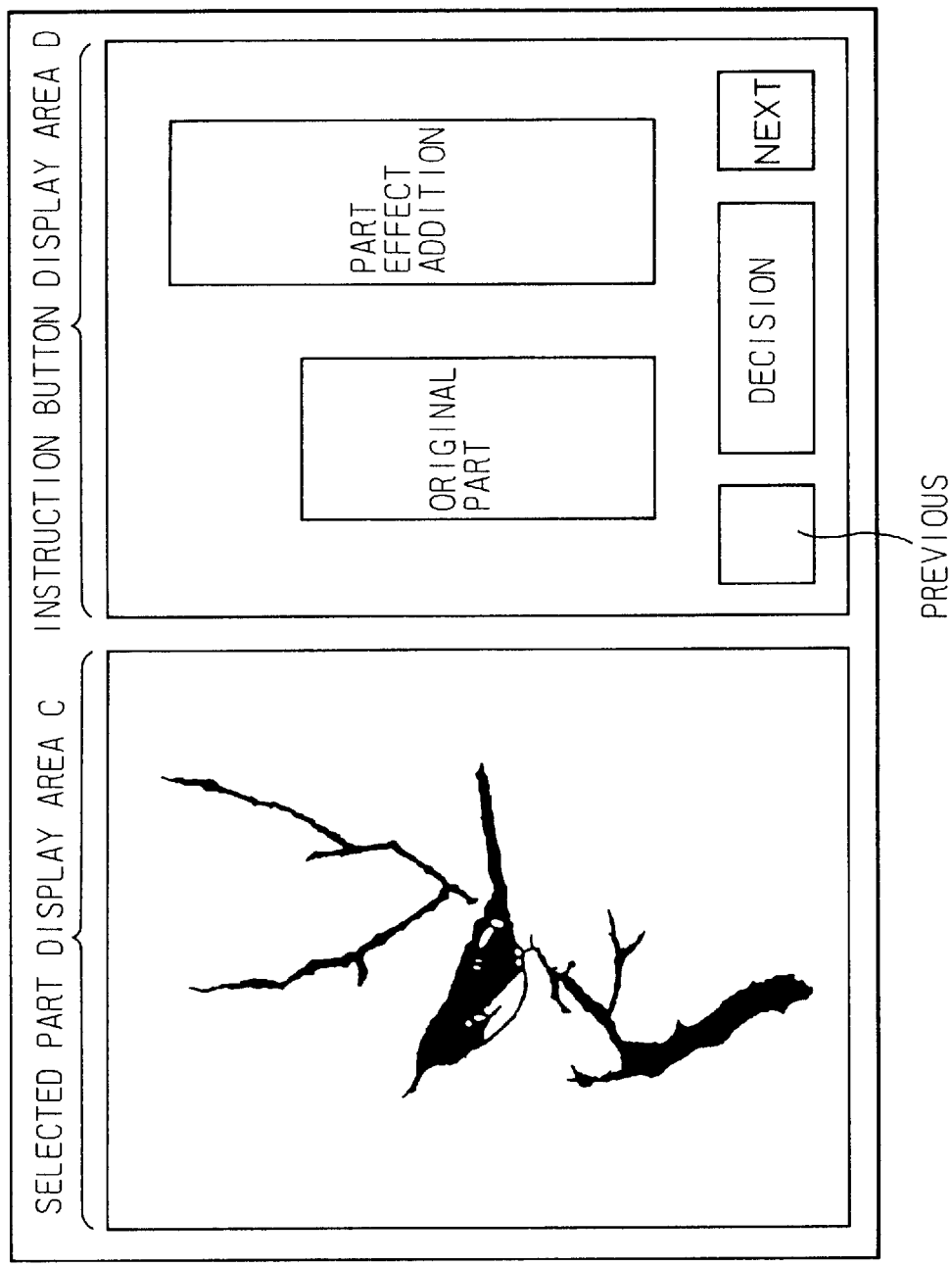
FIG. 8 is an explanatory diagram of a part effect addition screen in accordance with the embodiment.

FIG. 8 shows an example of a part effect addition screen. A part shown in FIG. 8 is an example resulting from part insertion described with reference to FIGS. 6 and 7. The part insertion for this example is such that part (1)-1 in FIG. 6 (image of a bush warbler) is selected and inserted into associated fields in the layouts in the layout area A.

After the part insertion is completed, when a user presses an "Effect Function" button displayed in the layout area A, the part effect addition screen shown in FIG. 8 used to add effect data to a selected part appears.

In the left part of the part effect addition screen, a selected part display area C is defined and a part selected as mentioned above is displayed. Displayed in the right part thereof are an instruction button display area D is defined, and a "Part Effect Addition" button used to instruct addition of effect data to a part displayed in the selected part display area C, an "Original Part" button used to instruct return to the display of an original part, and a "Decision" button used to decide on addition of effect data to a part.

With the part effect addition screen displayed, when a user presses the Part Effect Addition button, effect data is added to a part displayed in the selected part display area C. When the part with the effect data added appears in a desired form, if the Decision button is pressed, part effect addition is terminated.

With effect data added to a part by making the foregoing manipulations, if the Original Part button is pressed, the part displayed in the selected part display area C is returned to the initial display showing the part alone.

Furthermore, if a user presses the Part Effect Addition button by number of times exceeding the number of effect data items, the effect data items added to the part are successively deleted according to the frequency of pressing the button. Original part data is then restored.

Furthermore, a user can add effect data or restore original part data by directly manipulating a part displayed in the selected part display area C.

Figure 9:
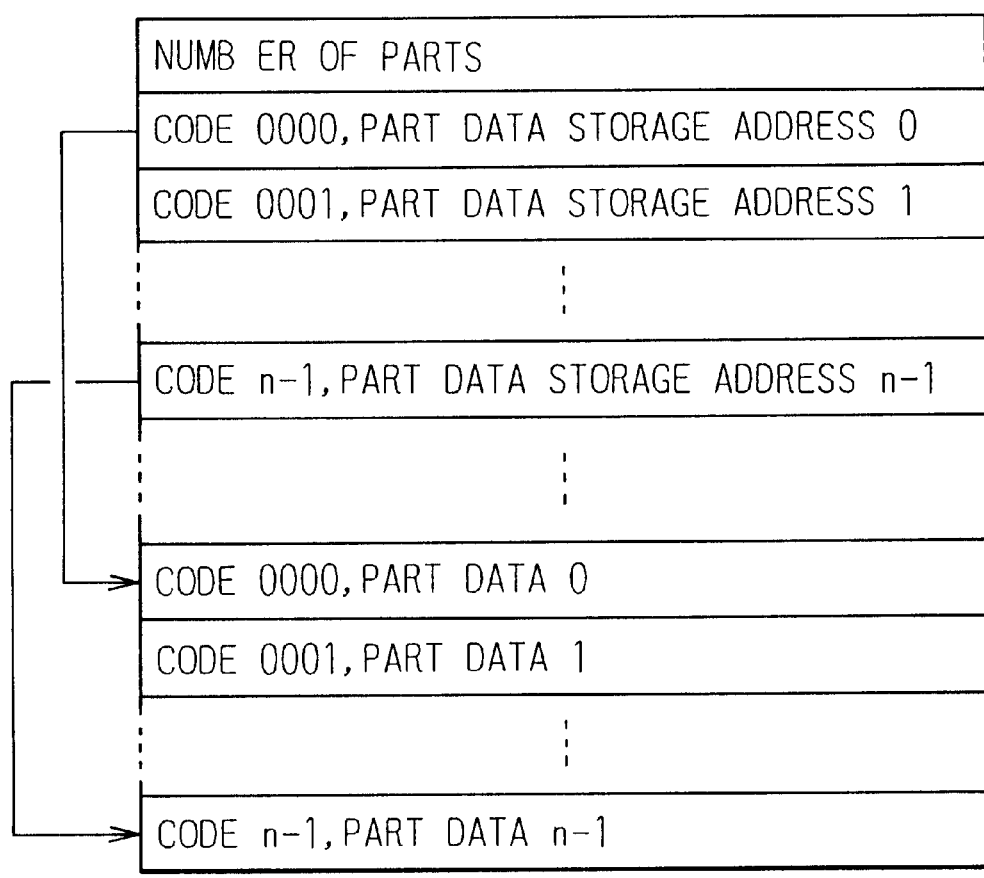
FIG. 9 is an explanatory diagram of part data.
Figure 11A:
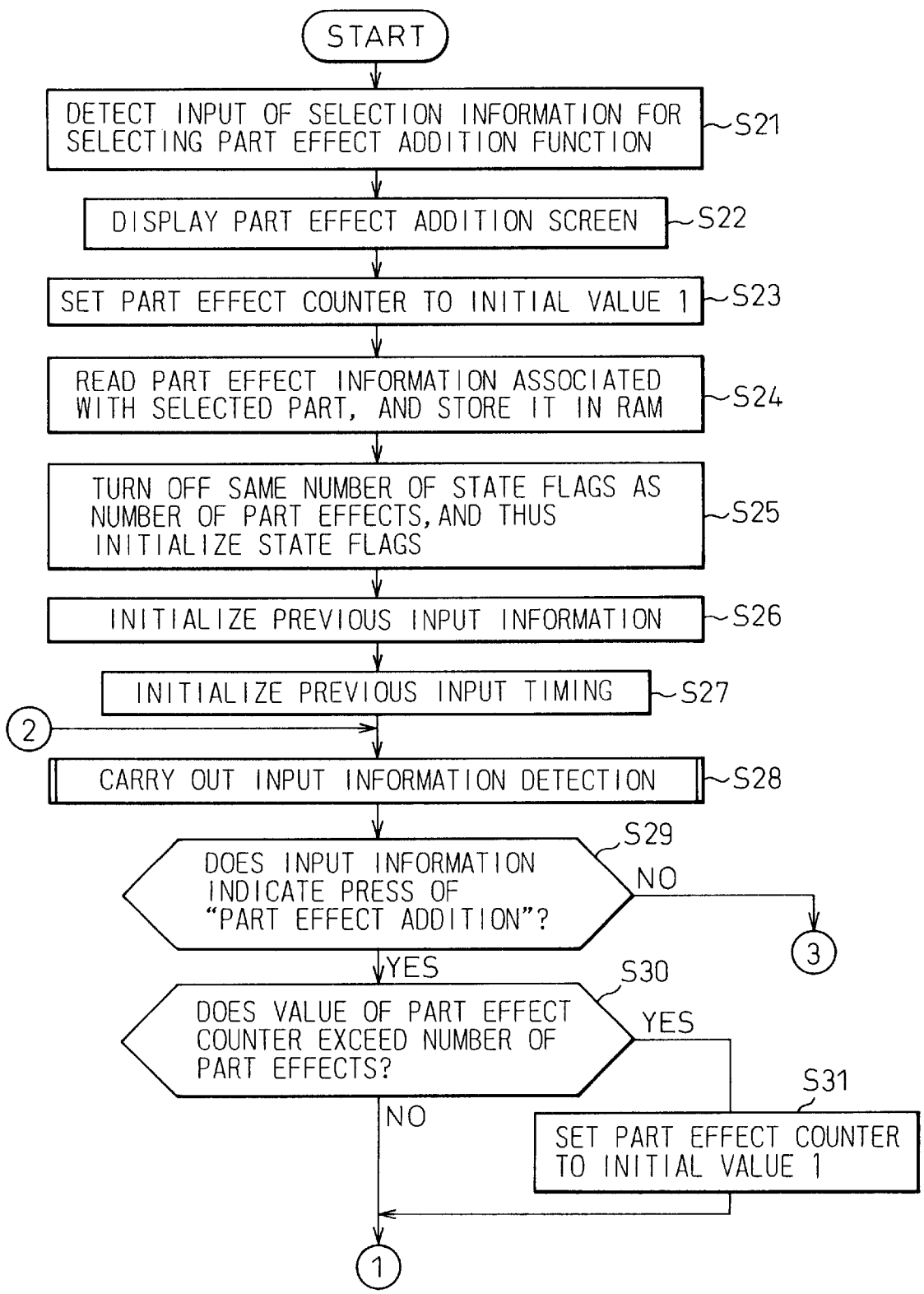
FIGS. 11A, 11B, 11C, and 11D are flowcharts describing first part effect addition.
Figure 11B:
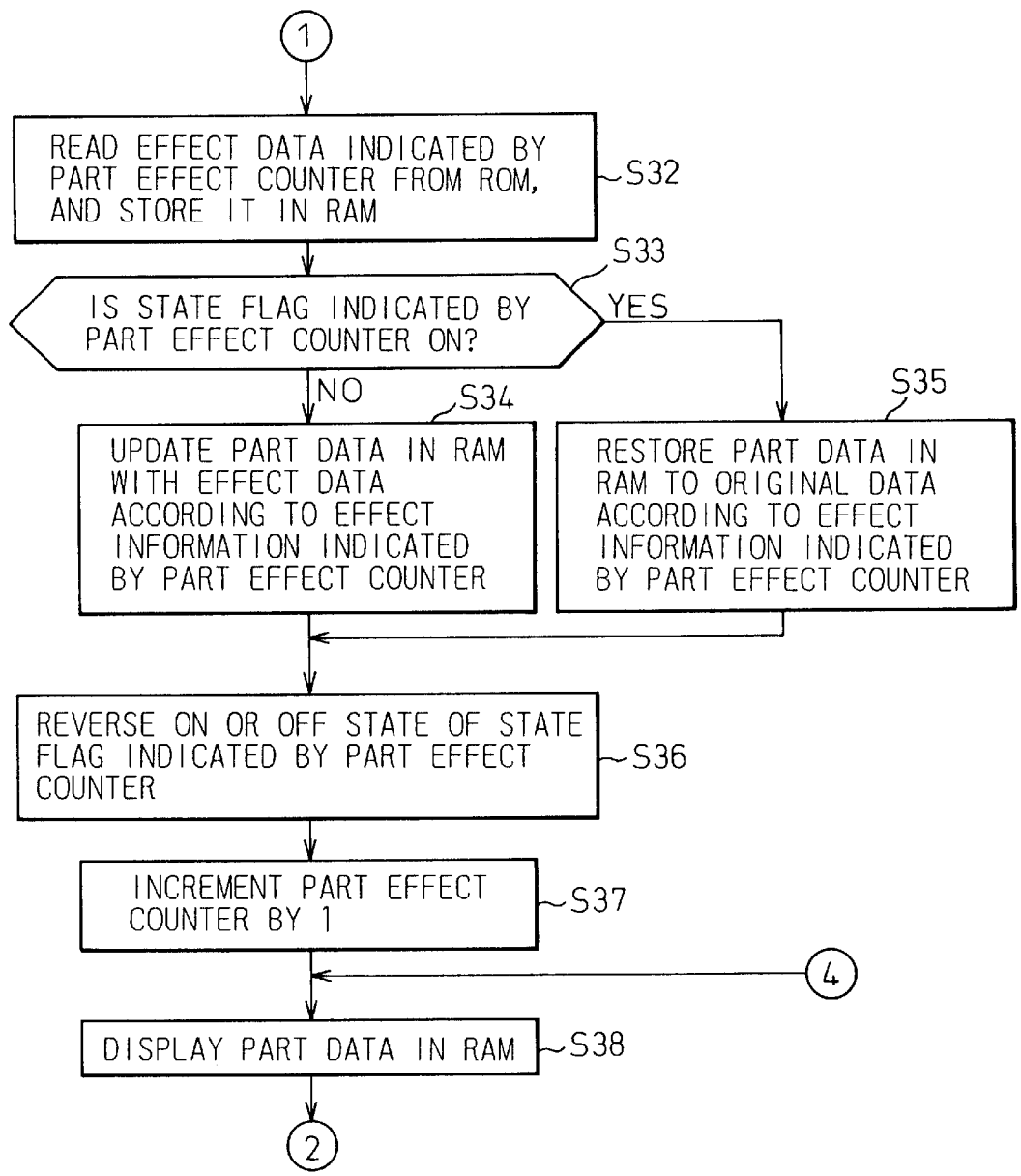
Figure 11C:
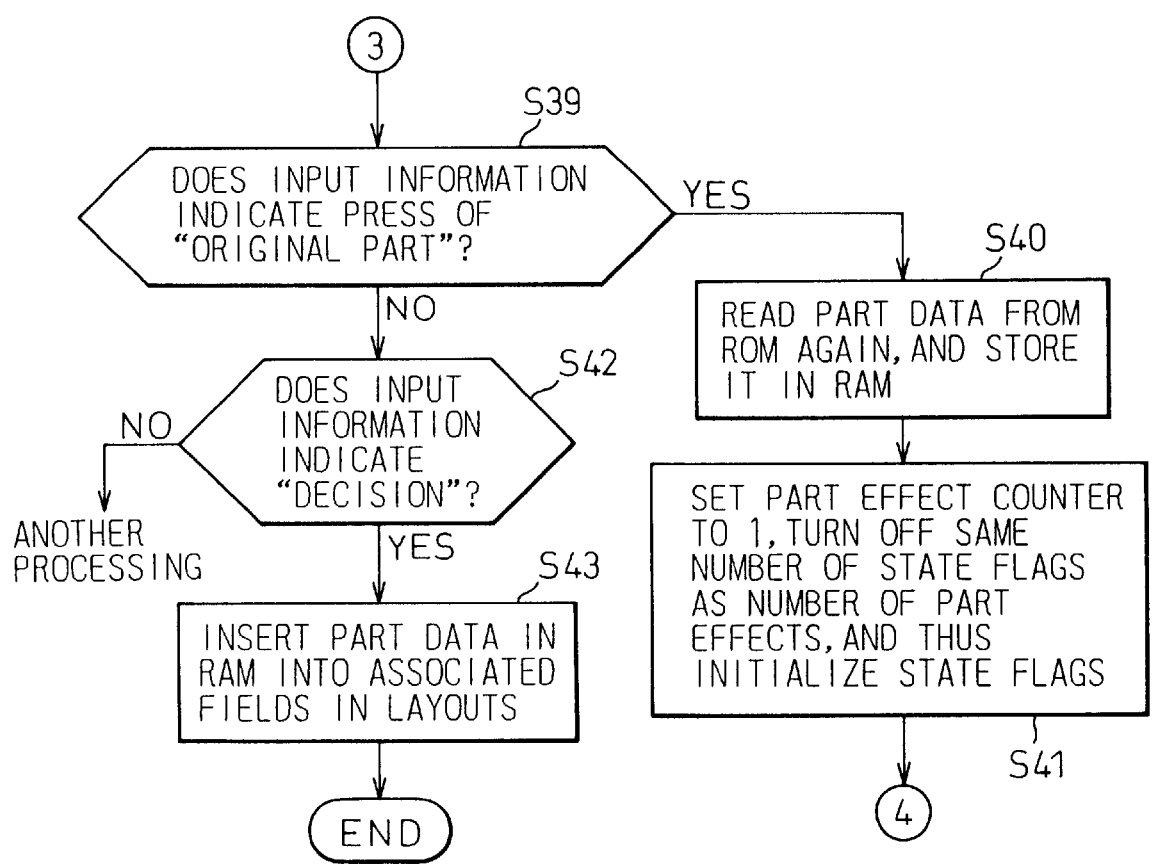
Figure 11D:
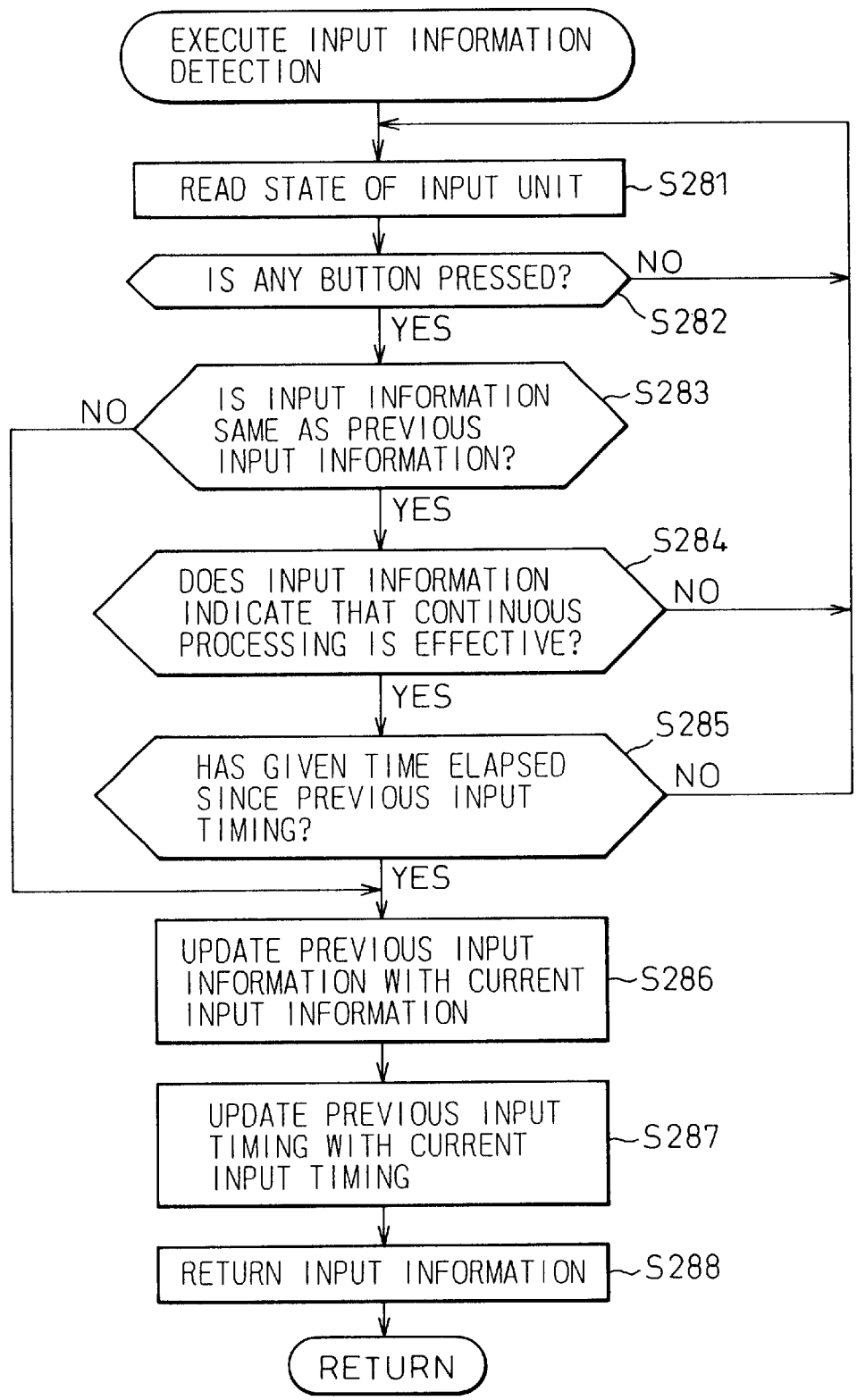

FIG. 9 is an explanatory diagram of part data. The structure and usage of part data will be described.

As shown in FIG. 9, part data is composed of the number of parts, part data storage addresses associated with part codes, and part data items to be displayed actually. The part data items displayed are those having one part attribute. These part data items are stored in relation to each part attribute in the ROM 15 shown in FIG. 2.

The part data items shown in FIG. 9 are used as described below during processing for displaying parts in the parts list area which is described in the flowchart of FIG. 5.

At step S4 in the flowchart of FIG. 5, part codes associated with part attribute (1) set as an initial value are used, part data storage addresses associated with the part codes are retrieved, and part data items stored at the addresses are then read from the ROM 15. The read part data items are then stored in the RAM 16.

Thereafter, at step S5, the part data items stored in the RAM 16 are analyzed and developed into depiction data items. The depiction data items are then output to the display unit 14 so that the parts can be displayed in the part display areas in the parts list display area B.

FIGS. 10A and 10B are explanatory diagrams of part effect information and effect data. FIG. 10A is a diagram showing a part effect information table, and FIG. 10B is a diagram showing part effect information and effect data concerning one part.

Part effect information is, as shown in FIG. 10A, like the part data shown in FIG. 9, composed of part effect information storage addresses associated with part codes and actual part effect information items. The part effect information storage addresses are addresses in the ROM 15 at which the actual part effect information items are stored.

The part effect information is, as shown in FIG. 10B, composed of the number of part effects and the same number of effect information items as the number of part effects. Each effect information is composed of an affixed position at which effect data is affixed, a size of the effect data, and a storage address at which the effect data is stored. The affixed position is a left upper position of a portion to which the effect data is affixed and which is indicated with dot positions in Y and X axes. The size is indicated with the numbers of dots lying lengthwise and sideways in the portion to which the effect data is affixed. The storage address is a leading address of an area in the ROM 15 in which the actual effect data is stored.

FIGS. 11A to 11D are flowcharts describing first part effect addition. S21 to S43 denote processing steps. The first part effect addition is processing of adding effect data to a selected part displayed in the selected part display area C in the aforesaid part effect addition screen responsively to manipulations made on the buttons displayed in the instruction button display area D in the part effect addition screen.

For part effect addition, the CPU 13 proceeds with the processing by running a control program responsively to a user's manipulation.

As mentioned previously, when the Effect Function button displayed in the layout area A is pressed by a user, input of selection information concerning a part effect addition function is detected (step S21). Data of the part effect addition screen is output to the display unit 14 and displayed thereon (step S22).

The part effect addition screen is displayed when selection of the Effect Function button is detected. Alternatively, the part effect addition screen may be displayed when selection of a part from the parts list display area B is detected. In this case, after processing described later is carried out responsively to a user's manipulation made in the part effect addition screen, a part with effect data added may be inserted into associated fields in the layouts displayed in the layout area A, and then displayed. When part effect addition is designed in this way, a user's manipulation of pressing the Effect Function button can be eliminated.

A part effect counter used to specify effect data to be read from the ROM 15 among effect data items corresponding to a selected part (part (1)-1 in the aforesaid example) is set to an initial value of 1 (step S23). A code assigned to the selected part is used to specify a corresponding part effect information storage address. Part effect information is then read from the address in the ROM 15 and stored in the RAM 16 (step S24)

The same number of state flags as the number of part effects specified in the part effect information are turned off to be initialized (step S25). Thus, input information entered with a user's manipulation is detected. The state flag indicates whether or not each effect data has already been added to a part. If a state flag is on, it means that effect data has been added to a part. If a state flag is off, it means that effect data has not been added to a part.

Previous input information and a previous input timing are initialized (steps S26 and S27). Information concerning an input entered at the input unit 11 with a user's manipulation is detected (step S28). The details of the input information detection is described in FIG. 11D.

At step S281, the state of the input unit is read. At step S282, it is judged whether or not any button is pressed. If the result of the judgment is in the negative, control is returned to step S281. If the result of the judgment is in the affirmative, control is passed to step S283. At step S283, it is judged whether or not input information is the same as the previous input information. If the result of the judgment is in the negative, control is passed to step S286. If the result of the judgment is in the affirmative, control is passed to step S284.

At step S284, it is judged from input information whether or not detected continuous processing is effective. If the result of the judgment is in the negative, control is returned to step S281. If the result of the judgment is in the affirmative, control is passed to step S285. At step S285, it is judged whether or not a given time has elapsed since the previous input timing. If the result of the judgment is in the negative, control is returned to step S281. If the result of the judgment is in the affirmative, control is passed to step S286. At step S286, the previous input information is updated with current input information. At step S287, the previous input timing is updated with a current input timing. At the last step S288, detected input information is returned in order to terminate input information detection.

According to the foregoing input information detection, the time during which the Effect Function button is pressed continuously is measured. If the button is pressed continuously for a given time or longer, processing activated with the press of the button is carried out at intervals of the given time.

Referring back to FIG. 11A, it is judged from input information whether or not the Part Effect Addition button has been selected (pressed) (step S29). If the input information indicates that the Part Effect Addition button has been pressed, it is judged whether or not a value indicated by a part effect counter exceeds the number of part effects specified in the part effect information (step S30).

Thereafter, based on an effect data storage address of effect information indicated with the value of the part effect counter, effect data stored in the ROM 15 is read and stored in the RAM 16 (step S32). For example, if the value of the part effect counter is 1, an effect data storage address 1 specified in effect information 1 shown in FIG. 10B is used to read effect data 1. If the value of the part effect counter is n, an effect data storage address n specified in effect information n is used to read effect data n.

It is then judged whether or not a state flag indicated with the value of the part effect counter is on (step S33). If the state flag is off, effect data is developed into depiction data according to the contents (affixed position and size) of effect information indicated by the part effect counter, and part data developed in the RAM 16 is updated using the effect data (step S34).

If it is judged at step S33 that the state flag is on, a portion of the part data residing in the RAM 16 which is defined with the affixed position and size specified in effect information indicated with the value of the part effect counter is restored to a corresponding portion of original area (step S35).

After the processing of step S34 or S35 is completed, the on or off state of the state flag indicated by the part effect counter is reversed (step S36), and the part effect counter is incremented by 1 (step S37). For example, when the value of the part effect counter is 1, the on or off state of a state flag associated with effect data 1 (for example, state flag 1) is reversed, and the value of the part effect counter is updated to 2.

After the above processing is completed, the part data developed in the RAM 16 is output to the display unit 14 and displayed in the selected part display area C in the part effect addition screen (step S38). Control is then returned to step S28 of detection of input information sent from the input unit 11 with a user's manipulation.

When the Part Effect Addition button is pressed a plurality of times by a user, the foregoing processing steps are repeated. Effect data items are successively added to a part.

When the number of presses of the Part Effect Addition button exceeds the number of part effects, that is, at step S30, it is judged that the value of the part effect counter exceeds the number of part effects. With this judgment, the part effect counter is set to the initial value of 1 (step S31).

At this time, all state flags are on. Since judgment is made positively at step S33, the processing of step S34 is not carried out, but portions of the part data residing in the RAM 16 to which effect data items are added are restored to corresponding portions of original part data according to effect information items indicated successively with the values of the part effect counter (step S35).

Restoration to original data is, like addition of effect data, carried out until the frequency of a user's pressing the Part Effect Addition button exceeds the number of effect data items.

When it is found at step S29 on the basis of input information sent from the input unit 11 with a user's manipulation that the Part Effect Addition button has not been selected, if it is detected that the Original Part button has been selected (step S39), selected part data is read from the ROM 15 again and stored in the RAM 16 (step S40). The part effect counter is set to the initial value of 1. The same number of state flags as the number of part effects are turned off to be initialized (step S41).

Thus, the part data stored in the RAM 16 is restored to original data devoid of effect data. The original data is displayed at step S38.

When it is found at step S39 on the basis of input information sent from the input unit 11 that the Original Part button has not been selected, it is detected that the Decision button has been selected (step S42), part effect addition is terminated. The part data in the RAM 16, which has undergone the part effect addition, is inserted into associated fields in the layouts displayed in the layout area A (step S43).

The processing of adding effect data to a selected part responsively to a manipulation of pressing a button displayed in the instruction button display area D has been described so far.

Next, second part effect addition of adding effect data to a selected part responsively to a manipulation made for a part displayed in the selected part display area C will be described.

Figure 12A:
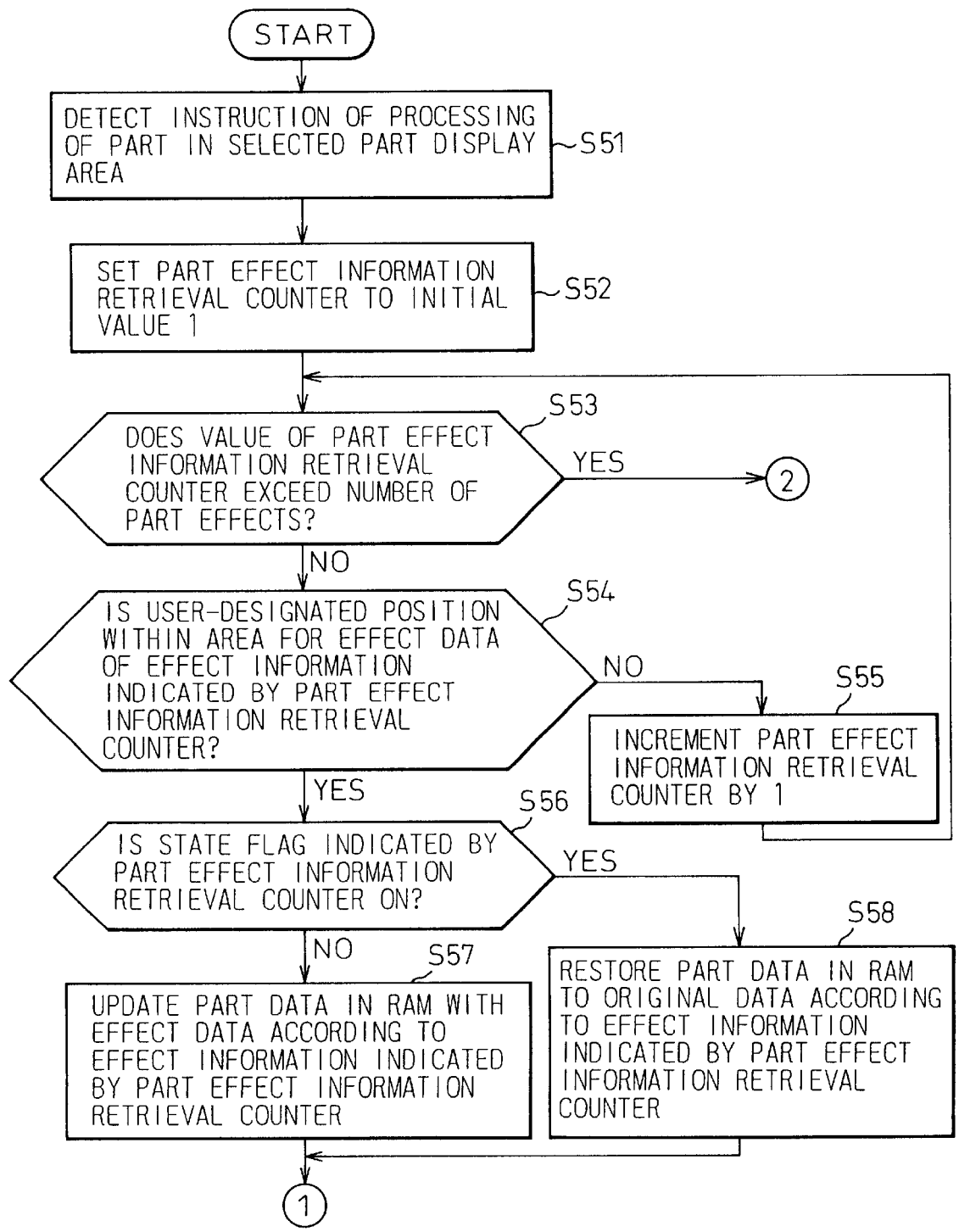
FIGS. 12A and 12B are flowcharts describing second part effect addition.
Figure 12B:
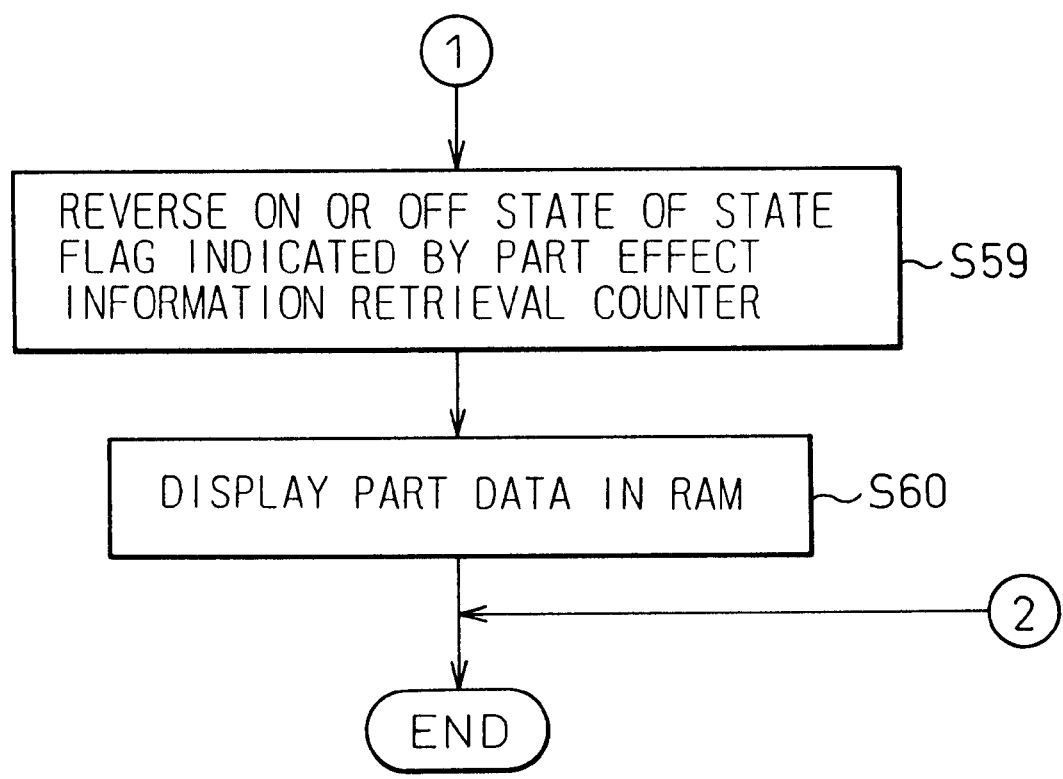

FIGS. 12A and 12B are flowcharts describing the second part effect addition. S51 to S60 denote processing steps. The CPU 13 carries out the second part effect addition when detecting a user's manipulation made for a part displayed in the selected part display area C in the part effect addition screen.

For the second part effect addition, the CPU 13 proceeds with the processing by running a control program responsively to a user's manipulation.

The processing described below is carried out after the following processing is completed: detection of input of selection information concerning the part effect addition function (step S21), processing of outputting and displaying data of the part effect addition screen to and on the display unit 14 (step S22), processing of specifying a part effect information storage address associated with the code of a selected part, reading part effect information stored at the address from the ROM 15, and storing the part effect information in the RAM 16 (step S24), processing of turning off the same number of state flags as the number of part effects specified in the part effect information of the selected part (step S25), initialization of previous input information and a previous input timing (steps S26 and S27), and input information detection (step S28).

If it is detected on the basis of input information sent from the input unit 11 with a user's manipulation that processing of part in the selected part display area C is instructed (step S51), a part effect information retrieval counter is set to an initial value of 1 (step S52).

It is then judged whether or not a position designated by a user lies within a portion to which effect data is added.

First, the value of the part effect information retrieval count is compared with the number of part effects in order to judge whether or not the value exceeds the number of part effects (step S53). If the value exceeds the number of part effects, the second part effect addition is terminated. If the value does not exceed the number of part effects, it is judged whether or not the position designated by a user lies within a portion defined with the affixed position and size of effect data specified in effect information indicated with the value of the part effect information retrieval counter (step S54).

For example, when the value of the part effect information retrieval counter is 1, the information of the affixed position and size of effect data 1 specified in effect information 1 is used to define the portion. When the value of the part effect information retrieval counter is n, the information of the affixed position and size of effect data n specified in effect information n is used to define the portion.

If it is judged that the user-designated position does not lie within the defined portion, the part effect information retrieval counter is incremented by 1 (step S55). Control is then returned to step S53 of comparison judgment. With this processing, it is judged whether or not there is effect data to be added to the portion containing the user-designated position.

As a result of the judgment, if effect information concerning effect data to be added to the portion containing the user-designated position is specified at step S55, it is judged whether or not a state flag (associated with the specified effect information) indicated with the current value of the part effect information retrieval counter is on (step S56).

If the state flag is off, the effect data is developed into depiction data according to the contents (affixed position and size) of the effect information indicated with the value of the part effect information retrieval counter. Part data developed in the RAM 16 is updated using the effect data (step S57). If the state flag is on, the portion of the part data in the RAM 16 defined with the contents of the effect information is restored to a corresponding portion of original part data (step S58).

After the processing of step S57 or S58 is completed, the on or off state of a state flag indicated with the part effect information retrieval counter is reversed (step S59). The part data developed in the RAM 16 is output to the display unit 14. The part to which effect data is added or which is restored is displayed in the selected part display area C in the part effect addition screen (step S60). The second part effect addition is then terminated.

For brevity's sake, the second part effect addition has been described independently of the first part effect addition. If it is found at step S42 in the control flow of the first part effect addition on the basis of input information that the Decision button has not been pressed, the second part effect addition may be executed. After part data in the RAM 16 is displayed at step S60 of the second part effect addition, control may be returned to step S28 in the control flow of the first part effect addition. Thus, part effect addition can be carried out according to one control flow.

An example of part effect addition to be carried out by displaying a dedicated processing screen used to add effect data to a part has been described so far. FIG. 13 is a diagram showing a resultant part with effect data items added.

In FIG. 13, a plurality of rectangular areas in the selected part display area C are portions defined with the affixed positions and sizes specified in effect information items. Hatched displays within the rectangular areas represent actually-added data items. The second part effect addition is carried out by judging whether or not a user-designated position lies within any of the rectangular areas.

Next, third part effect addition of adding effect data to a part without displaying the aforesaid dedicated processing screen will be described.

Figure 14A:
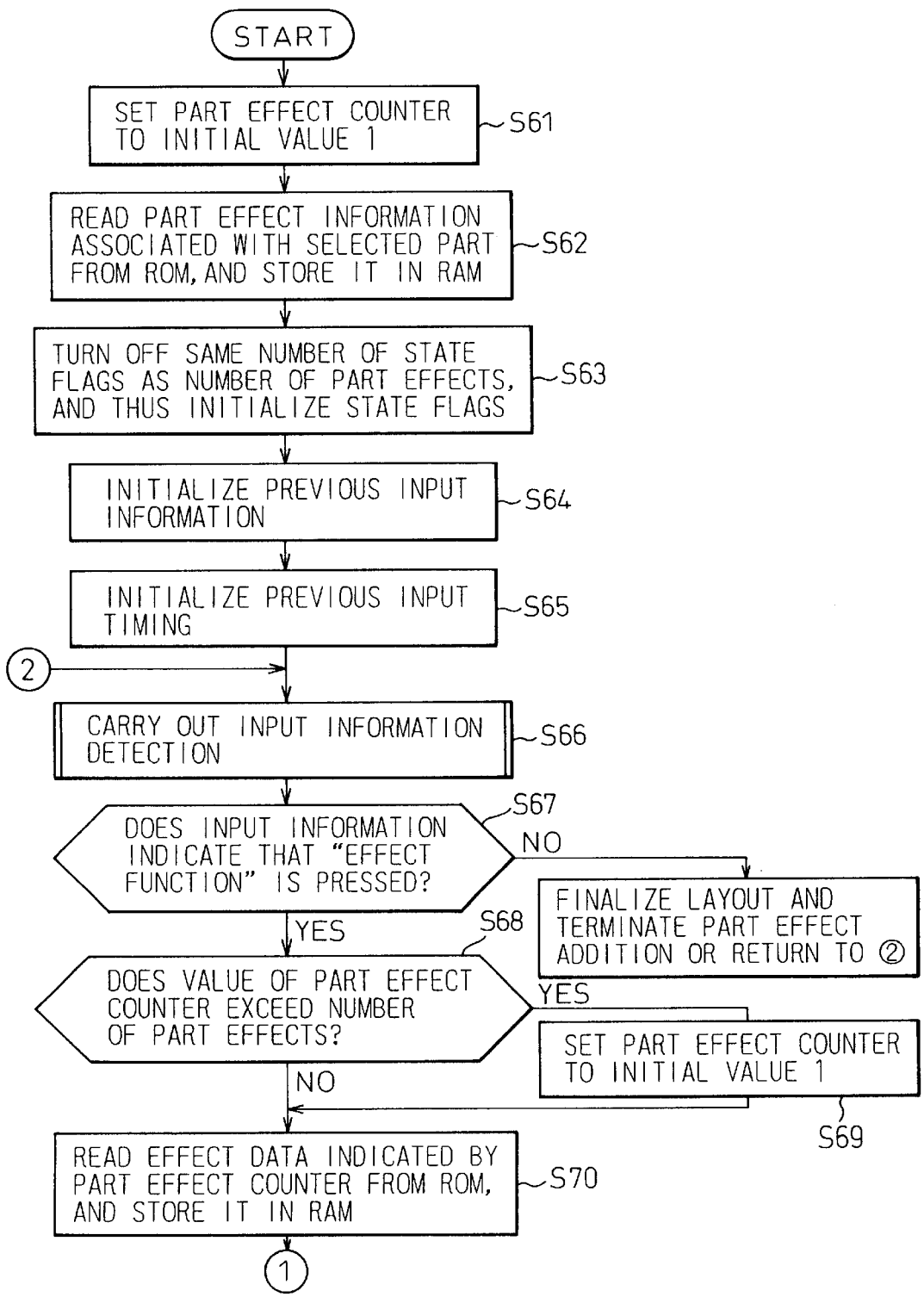

FIGS. 14A and 14B are flowcharts describing the third part effect addition. S61 to S76 denote processing steps.

For the third part effect addition, the CPU 13 proceeds with the processing by running a control program responsively to a user's manipulation.

According to the control flow of the first part effect addition, when the Effect Function button displayed in the layout area A is pressed by a user, input of selection information concerning the part effect addition function is detected at step S21, and data of the part effect addition screen is output to and displayed on the display unit 14 at step S22. In the third part effect addition, these processing steps are unnecessary. The contents of processing to be carried out responsively to selection of the Effect Function button are changed.

Displayed on the display screen on which a user makes a manipulation is the layout/parts list screen shown in FIG. 4. An initial state is, as shown in FIG. 6, a state in which a part is selected with a user's manipulation made in the layout/parts list screen, and the selected part is inserted into associated fields in the layouts in the layout area A.

When it is detected on the basis of input information sent from the input unit 11 that any of the parts displayed in the part display areas in the parts list area B has been selected, the part effect counter is set to an initial value of 1 (step S61). A part effect information storage address associated with the selected part is retrieved on the basis of the code of the selected part, and part effect information stored at the address is read from the ROM 15 and stored in the RAM 16 (step S62).

The same number of state flags as the number of part effects specified in the part effect information are turned off to be initialized (step S63). The state flag indicates whether or not each effect data has already been added to a part. If a state flag is on, it means that effect data has been added to a part. If a state flag is off, it means that effect data has not been added. Previous input information and a previous input timing are initialized (steps S64 and S65), and information concerning an input entered at the input unit 11 with a user's manipulation is detected (step S66). The contents of the input information detection are identical to those described in FIG. 11D.

The detected input information is then judged (step S67). If the result of the judgment on input information reveals that the Effect Function button has been selected (pressed), it is judged whether or not the value of the part effect counter exceeds the number of part effects specified in the part effect information (step S68).

If the value of the part effect counter does not exceed the number of part effects, effect data stored in the ROM 15 is read on the basis of an effect data storage address specified in effect information indicated with the value of the part effect counter, and stored in the RAM 16 (step S70). For example, when the value of the part effect counter is 1, an effect data storage address 1 specified in effect information 1 shown in FIG. 10B is used to read effect data 1. When the value of the part effect counter is n, an effect data storage address n specified in effect information n is used to read effect data n.

If it is judged at step S68 that the value of the part effect counter exceeds the number of part effects, the part effect counter is set to the initial value of 1 (step S69).

It is then judged whether or not a state flag indicated with the value of the part effect counter is on (step S71). If the state flag is off, the effect data is developed into depiction data according to the contents (affixed position and size) of effect information indicated by the part effect counter and the contents (position and size) of field information concerning each layout displayed in the layout area A. The part data developed in the RAM 16 is updated using the effect data (step S72).

If it is judged at step S71 that the state flag is on, a portion of the part data in the RAM defined with the contents (affixed position and size) of effect information indicated with the value of the part effect counter and the contents (position and size) of field information concerning each layout displayed in the layout area A is restored to a corresponding portion of original part data (step S73).

After the processing of step S72 or S73 is completed, the on or off state of a state flag indicated by the part effect counter is reversed (step S74), and the part effect counter is incremented by 1 (step S75). For example, when the value of the part effect counter is 1, the on or off state of a state flag associated with effect data 1 (for example, state flag 1) is reversed, and the value of the part effect counter is updated to 2.

After the above processing is completed, the processed part data in the RAM 16 is inserted into associated fields in the layouts displayed in the layout area A, and then displayed (step S76). Control is then returned to step S66 of input information detection.

As mentioned previously, when it is found at step S67 on the basis of input information that the Effect Function button has not been selected, if it is detected that a desired layout has been selected and thus determined with a user's manipulation (for example, if it is detected on the basis of input information sent from the input unit 11 that a displayed layout has been selected), a document having part data, which has been processed as mentioned previously, inserted into an associated field in the selected layout is created. The third part effect addition is then terminated.

According to the foregoing processing, when the Effect Function button is pressed by a user's manipulation, the same number of effect data items as the frequency of pressing the Effect Function button are added to a selected part displayed while being inserted into associated fields in all the layouts in the layout area A. Otherwise, when all effect data items have been added to a selected part, the same number of effect data items as the frequency of pressing the button are deleted in order to thus restore and display original data.

Even in the third part effect addition, similarly to the first part effect addition, a display area for, for example, the Original Part button may be defined in the layout/parts list display screen. In this case, when selection of the Original Part button is detected, a part with effect data added is restored to an original part by inserting a selected part displayed in the parts list area into fields in all the layouts.

Furthermore, fourth part effect addition or an example in which the aforesaid dedicated processing screen is not displayed, and the contents of part effect addition to be carried out responsively to detection of a press of the Effect Function button are changed will be described.

Figure 15A:
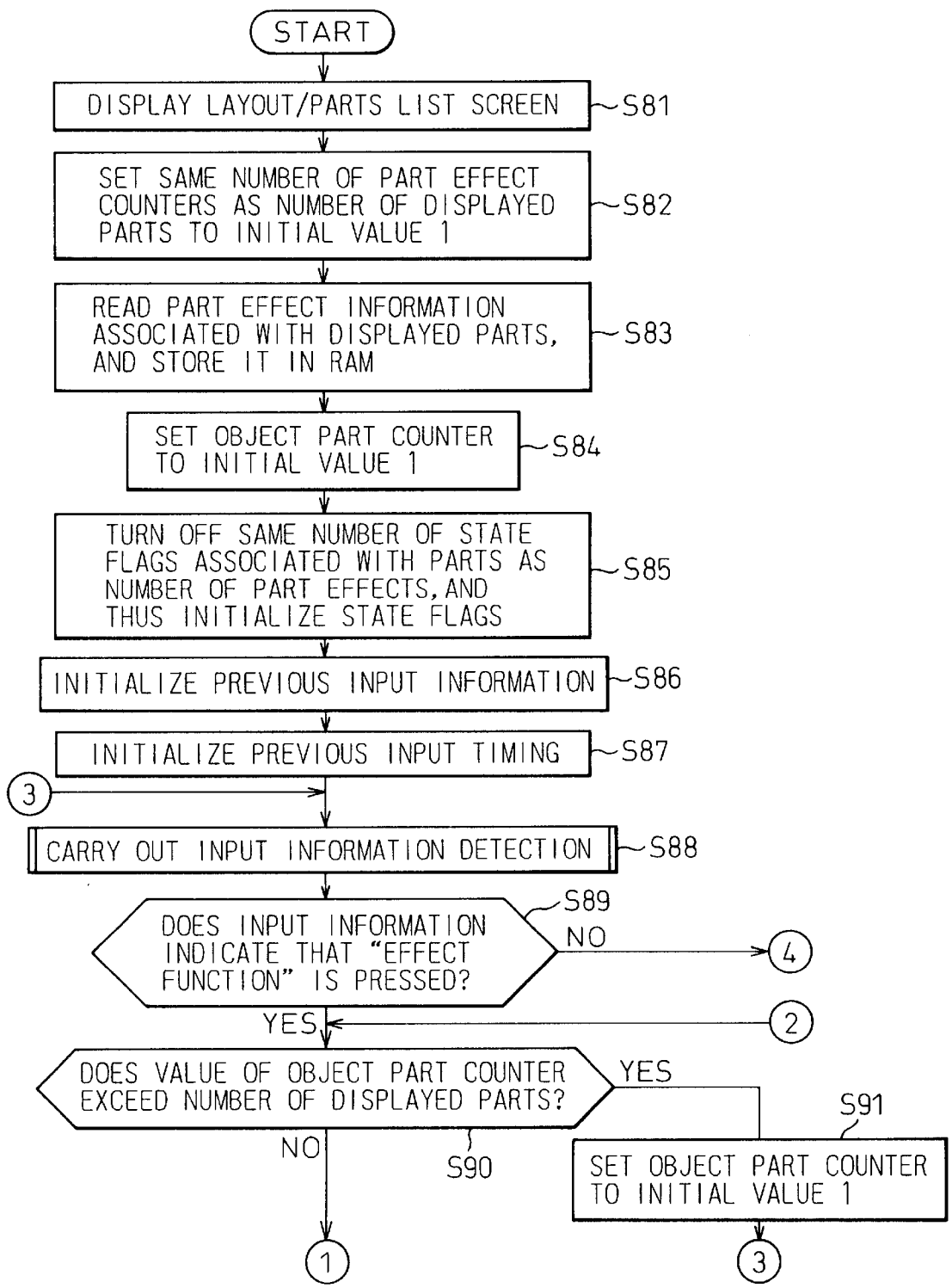
FIGS. 15A, 15B, and 15C are flowcharts describing fourth part effect addition.
Figure 15B:
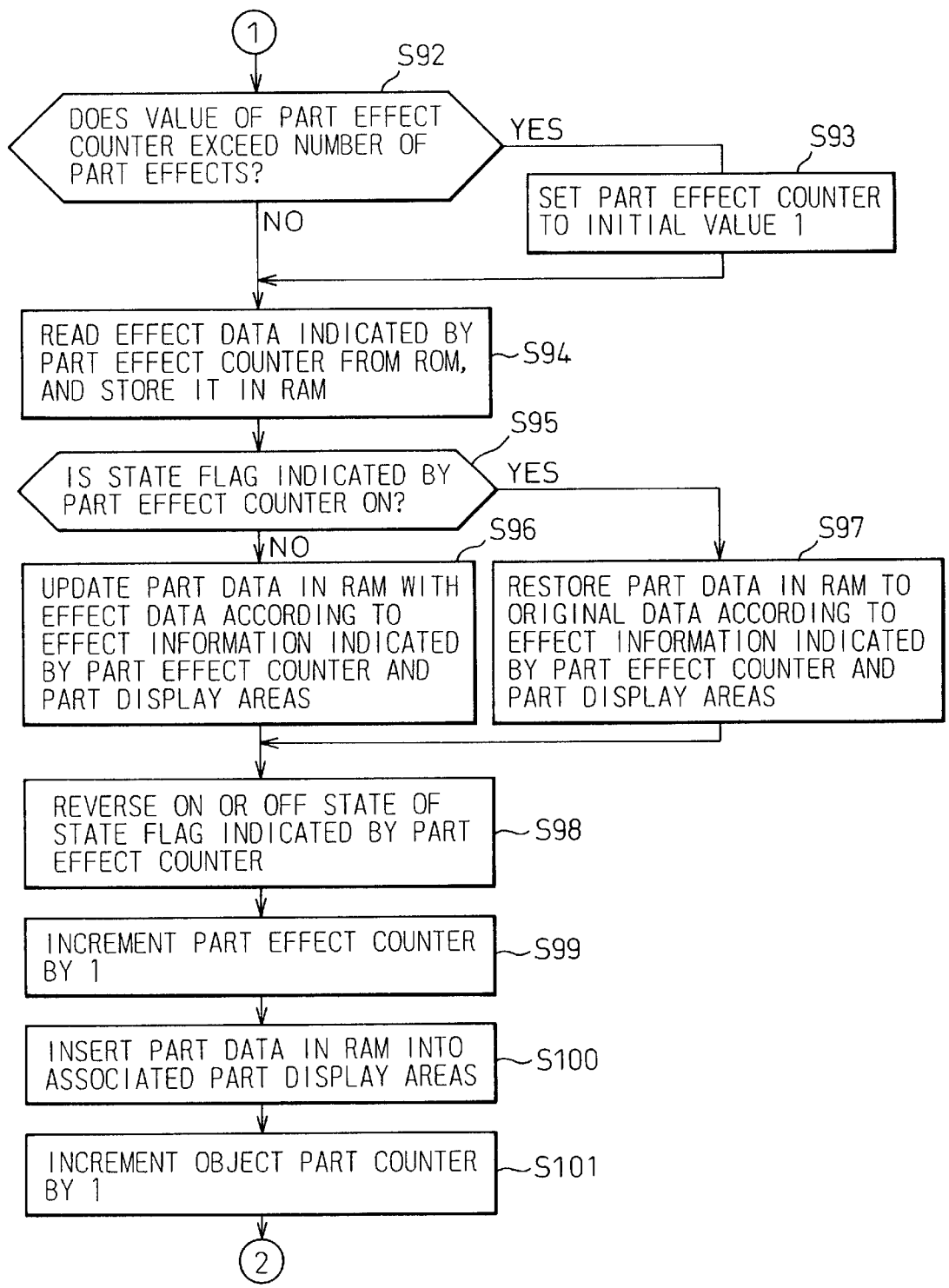
Figure 15C:
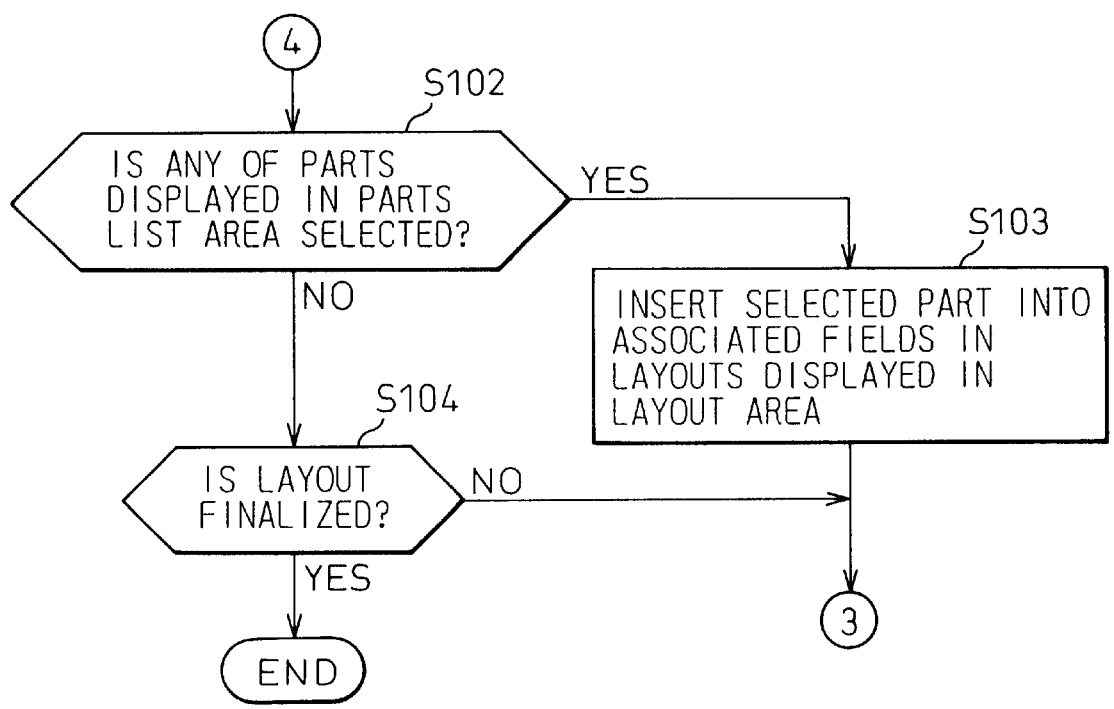
Figure 16:
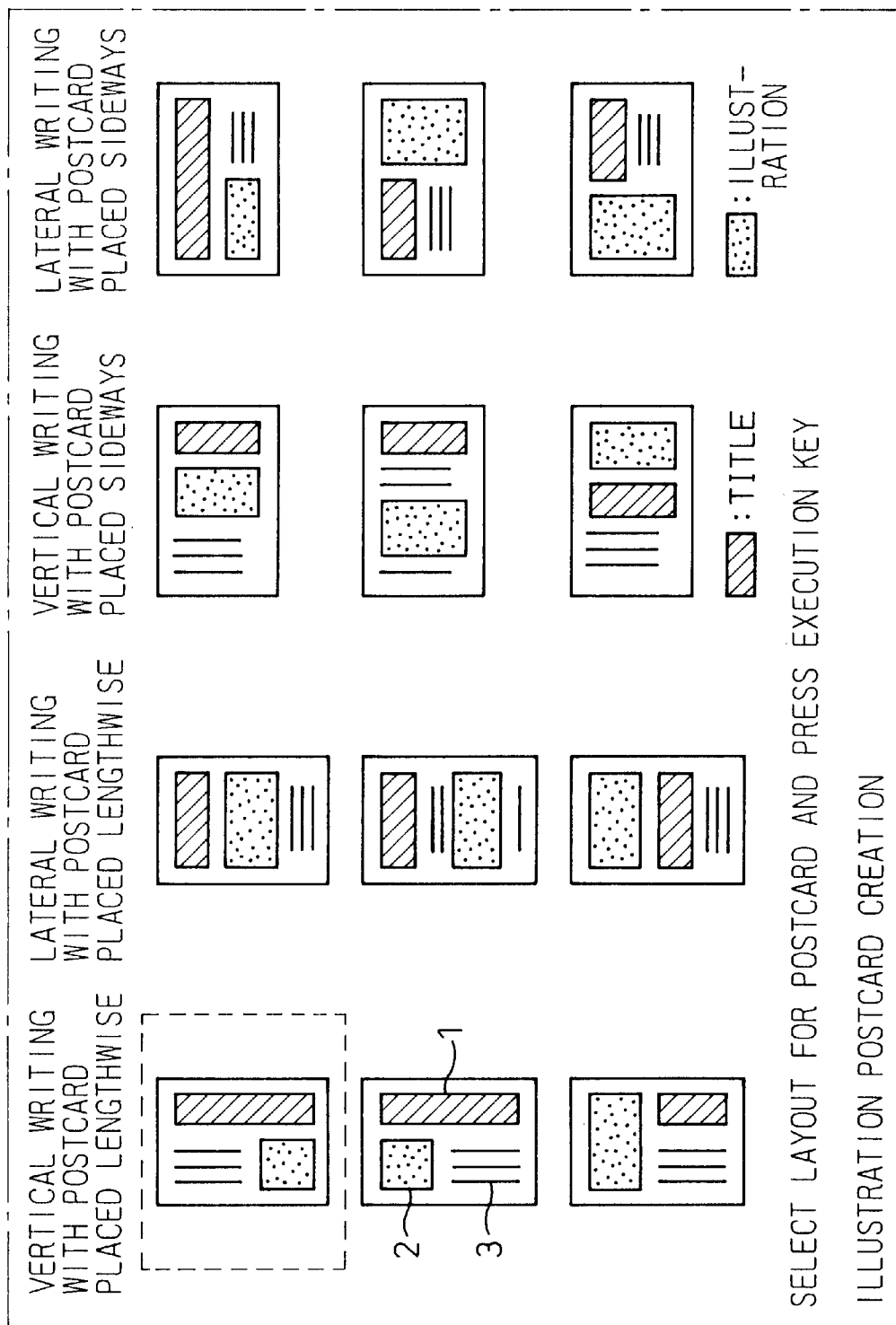
FIG. 16 shows a layout selection screen in accordance with a prior art.

FIGS. 15A, 15B, and 15C are flowcharts describing the fourth part effect addition. S81 to S104 denote processing steps.

The aforesaid third part effect addition is such that when the Effect Function button displayed in the layout area A is pressed by a user, the same number of effect data items as the frequency of pressing the Effect Function button are added to a selected part displayed while being inserted into associated fields in all the layouts in the layout area A. In the fourth part effect addition, corresponding effect data items are added to parts displayed in the part display areas in the parts list area B.

For the fourth part effect addition, the CPU 13 proceeds with the processing by running a control program responsively to a user's manipulation.

Displayed on the display screen on which a user makes a manipulation is the layout/parts list screen shown in FIG. 4. A plurality of part effect counters or at least the same number of part effect counters as the number of parts that can be displayed in the parts list area B, a plurality of state flags, and an object part counter are included. For example, when the display screen displays the screen shown in FIG. 4, nine part effect counters are included. A value indicated by the object part counter corresponds to a numeral assigned to a part display area.

First, the layout/parts list screen is displayed with a plurality of parts having a selected part attribute displayed in the parts list area B (step S81). The same number of part effect counters as the number of parts displayed in the parts list area B are set to an initial value of 1 (step S82). Part effect information storage addresses associated with the parts displayed in the parts list area B are retrieved on the basis of codes assigned to the parts, and part effect information items stored in the addresses are read from the ROM 15 and stored in the RAM 16 (step S83). The object part counter is also set to the initial value of 1 (step S84).

The same number of state flags associated with each part displayed in the part list area B as the number of part effects specified in the part effect information concerning the part are turned off to be initialized (step S85). The state flag indicates whether or not each effect data has already been added to a part. If a state flag is on, it means that effect data has been added to a part. If a state flag is off, it means that effect data has not been added to a part.

Previous input information and a previous input timing are initialized (steps S86 and S87), and detecting information concerning an input entered at the input unit 11 by a user's manipulation is carried out (step S88). The contents of the input information detection are identical to those described in FIG. 11D.

If it is judged from the detected input information that the Effect Function button has been selected (step S89), it is judged whether or not the value of the object part counter exceeds the number of parts displayed in the parts list area B (step S90).

If the value of the object part counter exceeds the number of displayed parts, the object part counter is set to the initial value of 1 (step S91), and control is returned to step S88 of input information detection.

If the value of the object part counter does not exceed the number of displayed parts, it is judged whether the value of a part effect counter associated with a part displayed in a part display area indicated with the value of the object part counter exceeds the number of part effects specified in the part effect information concerning the part (step S92). If the value of the part effect counter exceeds the number of part effects, the part effect counter is set to the initial value of 1 (step S93).

Thereafter, effect data stored in the ROM 15 is read on the basis of an effect data storage address specified in effect information indicated with the value of the part effect counter, and then stored in the RAM 16 (step S94). For example, when the value of the part effect counter is 1, an effect data storage address 1 specified in effect information 1 shown in FIG. 10B is used to read effect data 1. If the value of the part effect counter is n, an effect data storage address n specified in effect information n is used to read effect data n.

It is judged whether or not a state flag indicated with the value of the part effect counter is on (step S95). if the state flag is off, the effect data is developed into depiction data according to the contents (affixed position and size) of effect information indicated by the part effect counter and the position and size of a display in a part display area indicated with the value of the object part counter, and the part data developed in the RAM 16 is updated using the effect data (step S96).

If it is judged at step S95 that the state flag is on, a portion of the part data in the RAM 16 defined with the contents (affixed position and size) of effect information indicated with the value of the part effect counter and with the position and size of a display in a part display area indicated with the value of the object part counter is restored to a corresponding portion of original part data (step S97).

After the processing of step S96 or S97 is completed, the on or off state of a state flag indicated with the part effect counter is reversed (step S98), and the part effect counter is incremented by 1 (step S99). For example, when the value of the part effect counter is 1, the on or off state of a state flag associated with effect data 1 (for example, state flag 1) is reversed, and the part effect counter is updated to 2.

After the above processing is completed, the processed part data in the RAM 16 is inserted into the associated part display area in the parts list area B (step S100), the object part counter is incremented by 1 (step S101), and then control is returned to step S90.

If the result of the judgment made at step S89 is in the negative, or if it is judged from input information sent from the input unit 11 that any of the parts displayed in the parts list area B is selected (step S102), the selected part whose data is stored in the RAM 16 is inserted into associated fields in all the layouts displayed in the layout area A according to field information, and then displayed (step S103). Thus, a desired part with effect data added and displayed in the parts list area B can be inserted into associated fields in all the layouts in the layout area, and then displayed.

Moreover, when input information indicates that a layout is determined (step S104), this processing is terminated.

In the aforesaid first part effect addition, third part effect addition, and fourth part effect addition, as mentioned previously, when effect data is added to a part, the same number of effect data items as the frequency of pressing a display area (button) for instructing the addition are added to the part. The time during which the button is pressed continuously is measured. If it is found that the button is pressed continuously, processing activated responsively to a press of the button is carried out automatically at intervals of a given time.

In the second part effect addition, after part data is displayed at step S60, the time during which an area in the selected part display area is pressed continuously may be measured. If it is found that the area is pressed continuously for a given time, processing starting at step S56 is carried out.

Owing to the aforesaid constituent features, the frequency of a user's pressing a button can be reduced and the user's operational facility can be improved.

In the aforesaid first to fourth part effect addition, an amount of effect data to be added to a part shall be smaller than an amount of data of the part. The number of effect data items to be added to a part can be designated freely by a user. The number of parts a user can actually choose can be increased without an increase in storage capacity.

As described previously, the present invention can provide the advantages described below.

(1) Since parts having a selected part attribute are displayed as they are in a list of parts (unlike the prior art, characters are not displayed), parts that may be inserted into fields in layouts can be discerned readily. It is therefore easy to select a part to be inserted into associated fields in the layouts. Layout can be achieved easily. Moreover, the parts can be modified using effect data. Since an amount of effect data is smaller than an amount of part data, the number of parts to be provided as parts that can be chosen by a user can be increased while an increase in storage capacity is prevented.

(2) In the modification, a user can select a desired part and add effect data to the selected part. Moreover, all parts displayed in a list of parts can be handled as objects and effect data can be added to the object parts simultaneously. A user's manipulation for executing modification is simple. Besides, a desired part can be selected shortly.

(3) As for the effect data, a plurality of effect data items are provided. A user can freely designate the number of effect data items at the time of modification. Consequently, various parts of displays can be selected.

(4) The modification is carried out at intervals of a given time according to the time during which an instruction of executing the modification is entered continuously. The number of user's manipulations can therefore be reduced. This leads to improved operational facility.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A document processing apparatus, comprising:
   a layout data memory storing layout data used to lay out the contents of a document;
   a part data memory storing part data of parts to be inserted into layouts;
   a layout/parts list display controller defining a layout area and a parts list area in a screen on a display unit on the basis of the data residing in said layout data memory and said part data memory and displaying concurrently one layout or a plurality of layouts in said layout area and a list of parts to be inserted into the one layout or the plurality of layouts in said parts list area, each layout comprising a different predetermined layout template with fields associated with the parts in the parts list area;
   a part insertion unit, in response to a selection of one part from the list of parts displayed in said parts list area, inserting the selected part into the associated fields in all the layouts displayed in said layout area;
   an effect data memory unit storing predetermined effect data associated with the selected part; and
   a part effect addition unit superimposing the effect data on the part data for the selected part.

2. An apparatus according to claim 1, wherein said part effect addition unit uses the effect data to be added to a part inserted into a field in a selected layout.

3. An apparatus according to claim 2, wherein correspondence information concerning correspondence between the effect data and part data is included, and said part effect addition unit uses the effect data to be added to the corresponding part data according to the correspondence information.

4. An apparatus according to claim 1, wherein said part effect addition unit uses the effect data to be added to a part inserted into associated fields in all the layouts displayed in said layout area by said part insertion means.

5. An apparatus according to claim 4, wherein correspondence information concerning correspondence between the effect data and part data is included, and said part effect addition unit uses the effect data to be added to the corresponding part data according to the correspondence information.

6. An apparatus according to claim 1, wherein said part effect addition unit uses the effect data to be added to the parts displayed in said parts list area.

7. An apparatus according to claim 6, wherein correspondence information concerning correspondence between the effect data and part data is included, and said part effect addition unit uses the effect data to be added to the corresponding part data according to the correspondence information.

8. An apparatus according to claim 1, wherein a plurality of effect data items are prepared for each part data, and said part effect addition unit determines effect data to be used for addition according to an instruction entered at an input unit.

9. An apparatus according to claim 8, wherein correspondence information concerning correspondence between the effect data and part data is included, and said part effect addition unit uses the effect data to be added to the corresponding part data according to the correspondence information.

10. An apparatus according to claim 8, wherein said part effect addition unit determines effect data to be used for addition according to the number of instructions entered at said input unit.

11. An apparatus according to claim 10, wherein correspondence information concerning correspondence between the effect data and part data is included, and said part effect addition unit uses the effect data to be added to the corresponding part data according to the correspondence information.

12. An apparatus according to claim 8, wherein said part effect addition unit determines effect data to be used for addition according to the time during which an instruction is entered continuously at said input unit.

13. An apparatus according to claim 12, wherein correspondence information concerning correspondence between the effect data and part data is included, and said part effect addition unit uses the effect data to be added to the corresponding part data according to the correspondence information.

14. An apparatus according to claim 1, wherein correspondence information concerning correspondence between the effect data and part data is included, and said part effect addition unit uses the effect data to be added to the corresponding part data according to the correspondence information.

15. A document processing method, comprising:
   defining a layout area and a parts list area in a screen on a display unit on a basis of layout data used to lay out contents of a document and part data of parts to be inserted into layouts;

displaying concurrently one layout or a plurality of layouts in said layout area and a list of parts to be inserted into the one layout or the plurality of layouts in said parts list area, each layout comprising a different predetermined layout template with fields associated with the parts in the parts list area;

in response to selection of part from the list of parts displayed in said parts list area, inserting the selected part into the associated fields in all the layouts displayed in said layout area; and superimposing predetermined effect data associated with the selected part on the part data for the selected part.

16. A storage medium readable by a document processing apparatus and storing programs for processing documents by:

defining a layout area and a parts list area in a screen on a display unit on the basis of the layout data and part data;

displaying concurrently one layout or a plurality of layouts in said layout area and a list of parts to be inserted into the one layout or the plurality of layouts in said parts list area, each layout comprising a different predetermined layout template with fields associated with the parts in the parts list area;

in response to a selection of a part from the list of parts displayed in said parts list area, inserting the selected part into the associated fields in all the layouts displayed in said layout area; and superimposing predetermined effect data associated with the selected part on the part data for the selected part.

* * * * *

UNITED STATES PATENT AND TRADEMARK OFFICE
CERTIFICATE OF CORRECTION

PATENT NO. : 6,596,032 B2  Page 1 of 1
DATED : July 22, 2003
INVENTOR(S) : Shin-ichi Nojima et al.

It is certified that error appears in the above-identified patent and that said Letters Patent is hereby corrected as shown below:

Title page,
Item [56], References cited, U.S. PATENT DOCUMENTS, insert:

-- 5,895,475    04/1999    Eisenberg
       5,907,852    05/1999    Yamada
       6,154,295    11/2000    Fredlund et al. --
OTHER PUBLICATIONS, insert:

-- Adobe System Incorporated, Adobe Photoshop, version 3.0, 1994, pages 129-133, 142, 143.

Jostens Yearbook Technology, Yeartech Guide to Desktop Publishing Yearbooks, 1992, pages 4-1 to 4-8, 7-45 to 7-58.

Shaw et al., Microsoft Office 6 in 1, 1994, Que Corporation, pages 448-451, 472-477. --

Signed and Sealed this

Eighth Day of June, 2004

JON W. DUDAS
*Acting Director of the United States Patent and Trademark Office*